United States Patent
Chen et al.

(10) Patent No.: US 12,531,975 B2
(45) Date of Patent: Jan. 20, 2026

(54) PICTURE PREDICTION METHOD AND APPARATUS, AND COMPUTER-READABLE STORAGE MEDIUM

(71) Applicant: HUAWEI TECHNOLOGIES CO., LTD., Guangdong (CN)

(72) Inventors: Xu Chen, Shenzhen (CN); Huanbang Chen, Shenzhen (CN); Haitao Yang, Shenzhen (CN); Lian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/649,543

(22) Filed: Apr. 29, 2024

(65) Prior Publication Data
US 2024/0291965 A1    Aug. 29, 2024

Related U.S. Application Data

(63) Continuation of application No. 17/451,992, filed on Oct. 22, 2021, now Pat. No. 12,010,293, which is a
(Continued)

(30) Foreign Application Priority Data

Apr. 25, 2019   (CN) .................... 201910341218.6
Jun. 2, 2019    (CN) .................... 201910474007.X

(51) Int. Cl.
*H04N 19/105*    (2014.01)
*H04N 19/159*    (2014.01)
(Continued)

(52) U.S. Cl.
CPC ......... *H04N 19/105* (2014.11); *H04N 19/159* (2014.11); *H04N 19/176* (2014.11); *H04N 19/70* (2014.11)

(58) Field of Classification Search
CPC ...... H04N 19/51; H04N 19/70; H04N 19/105; H04N 19/119; H04N 19/159; H04N 19/176; H04N 19/593
See application file for complete search history.

(56) References Cited

U.S. PATENT DOCUMENTS

| 10,742,972 B1 | 8/2020 | Li et al. |
| 2012/0320984 A1 | 12/2012 | Zhou |

(Continued)

FOREIGN PATENT DOCUMENTS

| CN | 105376577 A | * | 3/2016 | ........... H04N 19/124 |
| CN | 106303534 A | | 1/2017 | |

(Continued)

OTHER PUBLICATIONS

ITU-T H.261 (Mar. 1993), Line Transmission of Non-Telephone Signals, Video Codec for Audiovisual Services at p×64 kbits, total 29 pages.
(Continued)

*Primary Examiner* — Peet Dhillon
(74) *Attorney, Agent, or Firm* — WOMBLE BOND DICKINSON (US) LLP

(57) ABSTRACT

Embodiments of this application disclose a picture prediction method and apparatus. The picture prediction method includes: determining whether a merge mode is used for a current picture block; when the merge mode is used for the current picture block, determining whether a level-1 merge mode is available for the current picture block; when the level-1 merge mode is unavailable, and a high-layer syntax element corresponding to a first merge mode indicates that the first merge mode is forbidden to be used, determining a second merge mode as a target merge mode used for the current picture block, where the first merge mode and the second merge mode are included in a level-2 merge mode; and predicting the current picture block based on the target
(Continued)

merge mode. In the embodiments of this application, redundancy generated in a merge mode determining process can be reduced as much as possible.

18 Claims, 14 Drawing Sheets

Related U.S. Application Data continuation of application No. PCT/CN2020/086418, filed on Apr. 23, 2020.

(51) Int. Cl.
*H04N 19/176* (2014.01)
*H04N 19/70* (2014.01)

(56) References Cited

U.S. PATENT DOCUMENTS

| | | | |
|---|---|---|---|
| 2013/0016785 A1* | 1/2013 | Wang | H04N 19/52 |
| | | | 375/240.16 |
| 2016/0100189 A1 | 4/2016 | Pang et al. | |
| 2018/0115787 A1 | 4/2018 | Koo et al. | |
| 2018/0332305 A1* | 11/2018 | Lin | H04N 19/70 |
| 2018/0343455 A1* | 11/2018 | Jang | H04N 19/119 |
| 2019/0182505 A1* | 6/2019 | Chuang | H04N 19/52 |
| 2021/0344969 A1* | 11/2021 | Zhang | H04N 19/159 |
| 2022/0086429 A1* | 3/2022 | Ko | H04N 19/52 |
| 2023/0115768 A1* | 4/2023 | Liao | H04N 19/172 |
| | | | 375/240.02 |

FOREIGN PATENT DOCUMENTS

| | | | | |
|---|---|---|---|---|
| CN | 109196864 A | * | 1/2019 | ........... H04N 19/117 |
| CN | 109587479 A | | 4/2019 | |
| CN | 111866515 A | * | 10/2020 | ........... H04N 19/139 |
| CN | 112204962 B | | 10/2021 | |
| EP | 3970378 A1 | | 3/2022 | |
| GB | 2582929 A | * | 10/2020 | ........... H04N 19/109 |
| JP | 2001136530 A | | 5/2001 | |
| JP | 2013236358 A | | 11/2013 | |
| JP | 2022518717 A | | 3/2022 | |
| RU | 2547240 C1 | | 4/2015 | |
| WO | WO-2012097376 A1 | * | 7/2012 | ........... H04N 19/176 |
| WO | 2012177388 A1 | | 12/2012 | |
| WO | WO-2013032074 A1 | * | 3/2013 | ........... H04N 19/124 |
| WO | 2017084512 A1 | | 5/2017 | |
| WO | WO-2017204532 A1 | * | 11/2017 | ........... H04N 19/117 |
| WO | WO-2020216294 A1 | * | 10/2020 | ........... H04N 19/103 |
| WO | WO-2020228560 A1 | * | 11/2020 | ........... H04N 19/105 |
| WO | WO-2021056219 A1 | * | 4/2021 | ........... H04N 19/103 |

OTHER PUBLICATIONS

ITU-T H.263(Jan. 2005), Series H: Audiovisual and Multimedia Systems, Infrastructure of audiovisual services—Coding of moving video, Video coding for low bit rate communication, total 226 pages.
ITU-T H.264(Apr. 2017), Series H: Audiovisual and Multimedia Systems, Infrastructure of audiovisual services—Coding of moving video, Advanced video coding for generic audiovisual services, total 812 pages.
ITU-T H.265(Feb. 2018), Series H: Audiovisual and Multimedia Systems Infrastructure of audiovisual services—Coding of moving video, High efficiency video coding, total 692 pages.
Document: JVET-K0500_r4, Fabien Racap et al, CE3-related: Wide-angle intra prediction for non-square blocks, Joint Video Experts Team (JVET) of ITU-T SG 16 WP 3 and ISO/IEC JTC 1/SC 29/WG 11, 11th Meeting: Ljubljana, SI, Jul. 10-18, 2018, total 13 pages.
International Standard ISO/IEC 11172-2:1993 Technical Corrigendum 3, Published Nov. 1, 2003, total 6 pages.
Rob Koenen, MPEG-4 Overview—(V.21-Jeju Version), ISO/IEC JTC1/SC29/WG11 N4668, Mar. 2002, total 77 pages.
Ling Li et al.,"CE10-related: syntax clean-up on triangle prediction", 13th Meeting: Marrakech, MA, Jan. 9-18, 2019, JVET-M0216-v2, total:4pages.
Benjamin Bross et al.,"Versatile Video Coding (Draft 4)", 13th Meeting: Marrakech, MA, Jan. 9-18, 2019,JVET-M1001-v7,total:299pages.
Yongjo Ahn et al.,"CE4-1.4: Syntax changes of merge data", 14th Meeting: Geneva, CH, Mar. 19-27, 2019,JVET-N252,total:4pages.
Man-Shu Chiang et al.,"CE10-related: Simplification of MPM generation for CIIP", 13th Meeting: Marrakech, MA, Jan. 9-18, 2019,JVET-M0183-v1,total 6pages.
Huanbang Chen et al.,"Non-CE4: On Merge data signaling", 15th Meeting: Gothenburg, SE, Jul. 3-12, 2019,JVET-O0431-v2,total:8pages.
Chih-Wei Hsu et al., CE4-related: On merge list construction, Joint Video Experts Team (JVET) of ITU-T SG 16 WP 3 and ISO/IEC JTC 1/SC 29/WG 11, 14th Meeting: Geneva, CH, 19 Mar. 27, 2019, 7 pages.
Sullivan et al., "Overview of the High Efficiency Video Coding (HEVC) Standard," IEEE Trans. on Circuits and Systems for Video Technology, vol. 22, No. 12, Dec. 2012, pp. 1649-1668. (Year: 2012).
Yang et al., "Description of CE4: Inter prediction and motion vector coding," Joint Video Experts Team (JVET) of ITU-T SG 16 WP 3 and ISO/I EC JTC 1/SC 29/WG 11, 10th Meeting: San Diego, US, Apr. 10-20, 2018, Document: JVET-J1024r2 . (Year: 2018).
Hsu et al., "CE4-related: On merge list construction", Joint Video Experts Team (JVET) of ITU-T SG 16 WP 3 and ISO/IEC JTC 1/SC 29/WG 11; 14th Meeting : Geneva, CH, 19 Mar. 27, 2019, Document: JVET-N0851, Mar. 24, 2019 (Mar. 24, 2019).

* cited by examiner

PICTURE PREDICTION METHOD AND APPARATUS, AND COMPUTER-READABLE STORAGE MEDIUM

CROSS-REFERENCE TO RELATED APPLICATIONS

This application is a continuation of U.S. Nonprovisional patent application Ser. No. 17/451,992, filed Oct. 22, 2021, which is a continuation of International Application No. PCT/CN2020/086418, filed on Apr. 23, 2020, The International Application claims priority to Chinese Patent Application No. 201910341218.6, filed on Apr. 25, 2019 and Chinese Patent Application No. 201910474007.X, filed on Jun. 2, 2019. All of the afore-mentioned patent applications are hereby incorporated by reference in their entireties.

TECHNICAL FIELD

This application relates to the field of video coding technologies, and more specifically, to a picture prediction method and apparatus, and a computer-readable storage medium.

BACKGROUND

A digital video capability can be incorporated into a wide variety of apparatuses, including a digital television, a digital live broadcast system, a wireless broadcast system, a personal digital assistant (PDA), a laptop or desktop computer, a tablet computer, an e-book reader, a digital camera, a digital recording apparatus, a digital media player, a video game apparatus, a video game console, a cellular or satellite radio phone (namely "smartphone"), a video conferencing apparatus, a video streaming apparatus, and the like. A digital video apparatus implements video compression technologies, such as video compression technologies described in standards defined in MPEG-2, MPEG-4, ITU-T H.263, and ITU-T H.264/MPEG-4 part 10 advanced video coding (AVC), a video coding standard H.265/high efficiency video coding (HEVC) standard, and extensions of such standards. The video apparatus can more efficiently transmit, receive, encode, decode, and/or store digital video information by implementing such video compression technologies.

The video compression technologies are used to perform spatial (intra-picture) prediction and/or temporal (inter-picture) prediction to reduce or remove inherent redundancy in video sequences. In block-based video coding, a video slice (namely, a video frame or a part of a video frame) may be partitioned into picture blocks, and the picture block may also be referred to as a tree block, a coding unit (CU), and/or a coding node. A picture block in a to-be-intra-coded (I) slice of a picture is coded through spatial prediction based on a reference sample in a neighboring block in the same picture. For a picture block in a to-be-inter-coded (P or B) slice of the picture, spatial prediction based on a reference sample in a neighboring block in the same picture or temporal prediction based on a reference sample in another reference picture may be used. The picture may be referred to as a frame, and the reference picture may be referred to as a reference frame.

When a merge mode is used to predict the picture block, there are generally a plurality of optional merge modes. In a conventional solution, a merge mode applicable to a current picture block is usually determined from a plurality of candidate merge modes one by one. When a merge mode is unavailable, whether a next merge mode is available continues to be determined. In the conventional solution, there is redundancy when the merge mode applicable to the current block is determined from the last two remaining merge modes.

SUMMARY

This application provides a picture prediction method and apparatus, and a computer-readable storage medium, to reduce redundancy in a picture prediction process as much as possible.

According to a first aspect, a picture prediction method is provided. The method includes: determining whether a merge mode is used for a current picture block; when the merge mode is used for the current picture block, continuing to determine whether a level-1 merge mode is available; when the level-1 merge mode is unavailable, and a high-layer syntax element corresponding to a first merge mode indicates that the first merge mode is forbidden to be used, determining a second merge mode as a target merge mode applicable to the current picture block; and predicting the current picture block based on the target merge mode.

Both the first merge mode and the second merge mode belong to a level-2 merge mode, and the level-2 merge mode includes the first merge mode and the second merge mode. In addition, for the current picture block, the level-1 merge mode and the level-2 merge mode already include all optional merge modes of the current picture block, and for the current picture block, a final target merge mode needs to be determined from the level-1 merge mode and the level-2 merge mode.

In an embodiment, a priority of the level-1 merge mode is higher than a priority of the level-2 merge mode.

That a priority of the level-1 merge mode is higher than a priority of the level-2 merge mode means that in a process of determining the target merge mode of the current picture block, the target merge mode is preferentially determined from the level-1 merge mode. If there is no available merge mode in the level-1 merge mode, the target merge mode is then determined from the level-2 merge mode.

In an embodiment, the determining whether a merge mode is used for a current picture block includes: when merge_flag corresponding to the current picture block is 1, determining that the merge mode is used for the current picture block; and when merge_flag corresponding to the current picture block is 0, determining that the merge mode is not used for the current picture block.

It should be understood that when it is determined that the merge mode is not used for the current picture block, another mode other than the merge mode may be used to predict the current picture block. For example, when it is determined that the merge mode is not used for the current picture block, an advanced motion vector AMVP mode may be used to predict the current picture block.

In this application, when the high-layer syntax element of the first merge mode indicates that the first merge mode is forbidden to be used, there is no need to parse available status information of the remaining second merge mode, and the second merge mode may be directly determined as the final target merge mode. This can reduce, as much as possible, redundancy generated due to determining of the target merge mode in a picture prediction process.

In an embodiment, the method further includes: determining whether the level-1 merge mode is available.

In an embodiment, whether the level-1 merge mode is available is determined based on a high-layer syntax element corresponding to the level-1 merge mode and/or available status information corresponding to the level-1 merge mode.

In an embodiment, when the level-1 merge mode is unavailable, and the high-layer syntax element corresponding to the first merge mode indicates that the first merge mode is allowed to be used, the target merge mode is determined based on a high-layer syntax element corresponding to the second merge mode and/or the available status information of the second merge mode.

The available status information of the second merge mode is used to indicate whether the second merge mode is used when the current picture block is predicted.

For example, the second merge mode is a CITP mode, and the available status information of the second merge mode is a value of ciip_flag. When ciip_flag is 0, the CIIP mode is unavailable for the current picture block. When ciip_flag is 1, the CITP mode is available for the current picture block.

It should be understood that, for the CIIP mode, if the CIIP mode is to be selected as the target merge mode, a high-layer syntax element corresponding to the CIIP needs to indicate that the CIIP mode is allowed to be used, and available status information that indicates an available status of the CIIP mode needs to indicate that the CIIP is available.

For example, when sps_ciip_enabled_flag=1 and ciip_flag=1, the CIIP mode may be determined as the target merge mode of the current picture block.

With reference to the first aspect, in some implementations of the first aspect, that the target merge mode is determined based on a high-layer syntax element corresponding to the second merge mode and/or the available status information of the second merge mode includes: When the high-layer syntax element corresponding to the second merge mode and/or the available status information of the second merge mode indicate/indicates that the second merge mode is forbidden to be used, the first merge mode is determined as the target merge mode.

That the high-layer syntax element corresponding to the second merge mode and/or the available status information of the second merge mode indicate/indicates that the second merge mode is forbidden to be used includes:

The high-layer syntax element corresponding to the second merge mode indicates that the second merge mode is forbidden to be used, and the available status information of the second merge mode indicates that the second merge mode cannot be used; and the high-layer syntax element corresponding to the second merge mode indicates that the second merge mode is allowed to be used, and the available status information of the second merge mode indicates that the second merge mode cannot be used.

In an embodiment, that the target merge mode is determined based on a high-layer syntax element corresponding to the second merge mode and/or the available status information of the second merge mode further includes: When the high-layer syntax element corresponding to the second merge mode indicates that the second merge mode is allowed to be used, and the available status information of the second merge mode indicates that the second merge mode is available, the second merge mode is determined as the target merge mode.

In an embodiment, before the target merge mode is determined based on the high-layer syntax element corresponding to the second merge mode and/or the available status information of the second merge mode, the method further includes: determining that at least one of the following conditions is met: A size of the current picture block meets a preset condition; and a skip mode is not used to predict the current picture block.

In other words, before the target merge mode is determined, it is necessary to further ensure that the size of the current picture block meets the condition, and the skip mode is not used for the current picture block. Otherwise, another mode other than the merge mode may be used to predict the current picture block.

With reference to the first aspect, in some implementations of the first aspect, that a size of the current picture block meets a preset condition includes: the current picture block meets the following three conditions:

(cdWidth*cbHeight)≥64;
cbWidth<128; and
cbHeight<128.

cdWidth is a width of the current picture block, and cbHeight is a height of the current picture block.

In an embodiment, the first merge mode includes a triangle partition mode TPM, and the second merge mode includes a combined intra and inter prediction CITP mode.

In an embodiment, when a high-layer syntax element corresponding to the TPM mode indicates that the TPM mode is forbidden to be used, the CIIP mode is determined as the target merge mode.

In this application, when the high-layer syntax element corresponding to the TPM mode indicates that the TPM mode is forbidden to be used, there is no need to determine, by parsing a high-layer syntax corresponding to the CIIP mode and/or available status information that indicates an available status of the CIIP mode, whether the CIIP mode is available. Instead, the CIIP mode may be directly determined as the target merge mode. This can reduce redundancy in the process of determining the target merge mode.

In an embodiment, when the high-layer syntax element corresponding to the TPM mode indicates that the TPM mode is allowed to be used, the target merge mode is determined based on the high-layer syntax element corresponding to the CIIP mode and/or the available status information that indicates the available status of the CIIP mode.

In an embodiment, when the high-layer syntax element corresponding to the CIIP mode and/or the available status information that indicates the available status of the CIIP mode indicate/indicates that the CIIP mode is forbidden to be used, the TPM mode is determined as the target merge mode.

In an embodiment, when the high-layer syntax element corresponding to the CIIP mode indicates that the CIIP mode is allowed to be used, and the available status information that indicates the available status of the CITP mode indicates that the CITP mode is available, the CIIP mode is determined as the target merge mode.

In an embodiment, before the target merge mode is determined based on the high-layer syntax element corresponding to the second merge mode and/or the available status information of the second merge mode, the method further includes: determining that a type of a slice or slice group in which the current picture block is located is B; and determining that a maximum quantity of candidate TPM modes supported by the slice or slice group in which the current picture block is located is greater than or equal to 2.

In an embodiment, before the target merge mode is determined based on the high-layer syntax element corresponding to the CIIP mode and/or the available status information that indicates the available status of the CIIP mode, the method further includes: determining that the type of the slice or slice group in which the current picture block is located is B; and determining that the maximum quantity of candidate TPM modes supported by the slice or slice group in which the current picture block is located is greater than or equal to 2.

In an embodiment, the first merge mode is a triangle partition mode TPM, and the second merge mode is a combined intra and inter prediction CIIP mode. The method further includes: when the level-1 merge mode is unavailable, and a high-layer syntax element corresponding to the TPM mode indicates that the TPM mode is allowed to be used, but the current picture block does not meet at least one of a condition A and a condition B, determining the CIIP mode as the target merge mode.

The condition A and the condition B are as follows:

Condition A: A type of a slice in which the current picture block is located is B.

Condition B: A maximum quantity of candidate TPM modes supported by the slice or slice group in which the current picture block is located is greater than or equal to 2.

The TPM mode can be selected as the target merge mode finally used to predict the current picture block only when both the condition A and the condition B are met.

On one hand, if either the condition A or the condition B is not met, the CIIP mode is determined as the target merge mode.

On another hand, when the high-layer syntax element corresponding to the TPM mode indicates that the TPM mode is forbidden to be used, if either the condition A or the condition B is not met, the CIIP mode is determined as the target merge mode.

On another hand, when the high-layer syntax element corresponding to the TPM mode indicates that the TPM mode is allowed to be used, if either the condition A or the condition B is not met, the CIIP mode is determined as the target merge mode.

In other words, the CIIP mode may be determined as the target merge mode provided that one of sps_trangle_enabled_flag=1, the condition A, and the condition B is not met.

On another hand, if sps_trangle_enabled_flag=1, the condition A, and the condition B are all met, the target merge mode needs to be determined based on ciip_flag according to several conditions in the prior art.

In an embodiment, the high-layer syntax element is a syntax element at at least one of a sequence level, a picture level, a slice level, and a slice group level.

In an embodiment, the level-1 merge mode includes a regular merge mode, a merge with motion vector difference MMVD mode, and a subblock merge mode.

When it is determined whether the level-1 merge mode is available, whether these modes are available may be sequentially determined in a sequence of the regular merge mode, the MMVD mode, and the subblock merge mode.

For example, whether the regular merge mode is available may first be determined. When the regular merge mode is unavailable (if the regular merge mode is available, the regular merge mode may be directly used as the final target merge mode), whether the MMVD mode is available continues to be determined. When the MMVD mode is unavailable, whether the subblock merge mode is available continues to be determined.

In an embodiment, the method further includes: when the level-1 merge mode is unavailable, determining the target merge mode from the level-2 merge mode, where the level-2 merge mode includes a TPM mode and a CIIP mode; and when the CIIP mode is allowed to be used, and any one of the following conditions is not met, determining the CIIP mode as the target merge mode:

Condition D: The TPM mode is allowed to be used.
Condition E: A skip mode is not used to predict the current picture block.

Condition F: (cbWidth*cbHeight)≥64.
Condition G: cbWidth<128.
Condition H: cbHeight<128.

cbWidth is a width of the current picture block, and cbHeight is a height of the current picture block.

In an embodiment, the prediction method is applied to an encoder side, to encode the current picture block.

In an embodiment, the prediction method is applied to a decoder side, to decode the current picture block.

According to a second aspect, a picture prediction method is provided. The method includes: determining whether a merge mode is used for a current picture block; when the merge mode is used for the current picture block, determining whether a level-1 merge mode is available; when the level-1 merge mode is unavailable, determining a target merge mode from a level-2 merge mode, where the level-2 merge mode includes a TPM mode and a CIIP mode; when the CIIP mode is allowed to be used, and any one of the following conditions (a condition 1 to a condition 5) is not met, determining the CIIP mode as the target merge mode:

Condition 1: The TPM mode is allowed to be used.
Condition 2: A type of a slice or slice group in which the current picture block is located is B.
Condition 3: A maximum quantity of candidate TPM modes supported by the slice or slice group in which the current picture block is located is determined to be greater than or equal to 2.
Condition 4: A size of the current picture block meets a preset condition.
Condition 5: A skip mode is not used to predict the current picture block.

The first condition may be represented by sps_triangle_enabled_flag=1, the second condition may be represented by slice_type==B, and the third condition may be represented by MaxNumTriangleMergeCand≥2. MaxNumTriangleMergeCand indicates the maximum quantity of candidate TPM modes supported by the slice or slice group in which the current picture block is located.

In addition, for the current picture block, the level-1 merge mode and the level-2 merge mode may include all optional merge modes of the current picture block, and for the current picture block, a final target merge mode needs to be determined from the level-1 merge mode and the level-2 merge mode.

In an embodiment, a priority of the level-1 merge mode is higher than a priority of the level-2 merge mode.

That a priority of the level-1 merge mode is higher than a priority of the level-2 merge mode means that in a process of determining the target merge mode of the current picture block, the target merge mode is preferentially determined from the level-1 merge mode. If there is no available merge mode in the level-1 merge mode, the target merge mode is then determined from the level-2 merge mode.

In an embodiment, that a size of the current picture block meets a preset condition includes: the current picture block meets the following three conditions:

(cdWidth*cbHeight)≥64;
cbWidth<128; and
cbHeight<128.

In an embodiment, the determining whether a merge mode is used for a current picture block includes: when merge_flag corresponding to the current picture block is 1, determining that the merge mode is used for the current picture block; and when merge_flag corresponding to the current picture block is 0, determining that the merge mode is not used for the current picture block.

It should be understood that when it is determined that the merge mode is not used for the current picture block, another mode other than the merge mode may be used to predict the current picture block. For example, when it is determined that the merge mode is not used for the current picture block, an advanced motion vector AMVP mode may be used to predict the current picture block.

In an embodiment, the level-1 merge mode includes a regular merge mode, an MMVD mode, and a subblock merge mode.

When it is determined whether the level-1 merge mode is available, whether these modes are available may be sequentially determined in a sequence of the regular merge mode, the MMVD mode, and the subblock merge mode. When all the modes are unavailable, it is determined that the level-1 merge mode is unavailable.

In this application, when the level-1 merge mode is unavailable, it may be determined, based on some preset conditions, whether to select the CITP mode as the final merge mode, and the CITP mode may be directly determined as the target merge mode provided that any one of the preset conditions is not met. This reduces redundancy generated in the process of determining the target merge.

In an embodiment, the determining a target merge mode from a level-2 merge mode includes: when any one of the condition 1 to the condition 5 is not met, setting a value of available status information that indicates an available status of the CIIP mode to a first value, where when the value of the available status information that indicates the available status of the CIIP mode is the first value, the CIIP mode is used to perform picture prediction on the current picture block.

It should be understood that the setting a value of available status information that indicates an available status of the CIIP mode to a first value herein is equivalent to determining the CIIP as the target merge mode.

In an embodiment, the available status information that indicates the available status of the CIIP mode is ciip_flag.

The setting a value of available status information that indicates an available status of the CIIP mode to a first value may be setting ciip_flag to 1.

In addition, when the value of the available status information that indicates the available status of the CIIP mode is set to a second value, it may mean that the CIIP mode is not used to perform picture prediction on the current picture block. For example, when the available status information that indicates the available status of the CIIP mode is ciip_flag, and ciip_flag=0, the CIIP mode is not used to perform picture prediction on the current picture block.

In an embodiment, the determining a target merge mode from a level-2 merge mode includes: when all conditions from the condition 1 to the condition 5 are met, determining the target merge mode based on a high-layer syntax element corresponding to the CIIP mode and/or the available status information that indicates the available status of the CIIP mode, where the available status information that indicates the available status of the CIIP mode is used to indicate whether the CIIP mode is used when the current picture block is predicted.

For example, the available status information that indicates the available status of the CIIP mode is a value of ciip_flag. When ciip_flag is 0, the CIP mode is unavailable for the current picture block. When ciip_flag is 1, the CIIP mode is available for the current picture block.

In this application, the target merge mode can be determined based on the high-layer syntax element of the CIP mode and/or the available status information that indicates the available status of the CIIP mode only when the five preset conditions are met. Compared with a conventional solution, more conditions need to be met before the target merge mode is further determined based on the high-layer syntax element and the available status information of the CIIP mode. Otherwise, the CIIP mode may be directly determined as the target merge mode. This can reduce some redundant processes in the process of determining the target merge mode.

In an embodiment, the determining the target merge mode based on a high-layer syntax element corresponding to the CIIP mode and/or the available status information that indicates the available status of the CIIP mode includes: when the high-layer syntax element corresponding to the CIIP mode and/or the available status information that indicates the available status of the CIIP mode indicate/indicates that the CIIP mode is forbidden to be used, determining the TPM mode as the target merge mode.

In an embodiment, when the high-layer syntax element corresponding to the CIIP mode and/or the available status information that indicates the available status of the CIIP mode indicate/indicates that the CIIP mode is forbidden to be used, the determining the TPM mode as the target merge mode includes:

when the high-layer syntax element corresponding to the CIIP mode and/or the available status information that indicates the available status of the CIIP mode indicate/indicates that the CIIP mode is forbidden to be used, setting a value of available status information that indicates an available status of the TPM mode to a first value, where when the value of the available status information that indicates the available status of the TPM mode is the first value, the TPM mode is used to perform picture prediction on the current picture block.

It should be understood that the setting a value of available status information that indicates an available status of the TPM mode to a first value herein is equivalent to determining the TPM as the target merge mode.

In an embodiment, the available status information that indicates the available status of the TPM mode is MergeTriangleFlag.

The setting a value of available status information that indicates an available status of the TPM mode to a first value may be setting MergeTriangleFlag to 1.

In an embodiment, before the target merge mode is determined based on the high-layer syntax element corresponding to the CIIP mode and/or the available status information that indicates the available status of the CIIP mode, the method further includes:

determining that at least one of the following conditions is met:

A size of the current picture block meets a preset condition; and a skip mode is not used to predict the current picture block.

cdWidth is a width of the current picture block, and cbHeight is a height of the current picture block.

According to a third aspect, a picture prediction method is provided. The method includes: determining whether a merge mode is used for a current picture block; when the merge mode is used for the current picture block, determining whether a level-1 merge mode is available; and when the level-1 merge mode is unavailable, determining a target merge mode from a level-2 merge mode. The level-2 merge mode includes a TPM mode and a CIIP mode. When the CIIP mode is allowed to be used, and all the following conditions (a condition 1 to a condition 3) are met, available status information of the CIIP mode is obtained by parsing a bitstream, and the target merge mode is determined based on the available status information of the CIIP mode:

Condition 1: The TPM mode is allowed to be used.
Condition 2: A size of the current picture block meets a preset condition.
Condition 3: A skip mode is not used to predict the current picture block.

In an embodiment, if the available status information of the CIIP mode obtained by parsing the bitstream indicates that the CIIP mode is unavailable, the TPM is used as the target merge mode.

In this application, when the level-1 merge mode is unavailable, it may be determined, based on some preset conditions, whether to select the CIIP mode as a final merge mode, and the CIIP mode may be directly determined as the target merge mode provided that any one of the preset conditions is not met. This reduces redundancy generated in a process of determining the target merge.

According to a fourth aspect, a picture prediction method is provided. The method includes: determining whether a merge mode is used for a current picture block; when the merge mode is used for the current picture block, determining whether a level-1 merge mode is available; and when the level-1 merge mode is unavailable, determining a target merge mode from a level-2 merge mode. The level-2 merge mode includes a TPM mode and a CIIP mode. When the CIIP mode is allowed to be used, and all the following conditions (a condition 1 to a condition 5) are met, available status information of the CIIP mode is obtained by parsing a bitstream, and the target merge mode is determined based on the available status information of the CIIP mode:

Condition 1: The TPM mode is allowed to be used.
Condition 2: A type of a slice or slice group in which the current picture block is located is B.
Condition 3: A maximum quantity of candidate TPM modes supported by the slice or slice group in which the current picture block is located is determined to be greater than or equal to 2.
Condition 4: A size of the current picture block meets a preset condition.
Condition 5: A skip mode is not used to predict the current picture block.

In an embodiment, if the available status information of the CIIP mode obtained by parsing the bitstream indicates that the CITP mode is unavailable, the TPM is used as the target merge mode.

In this application, when the level-1 merge mode is unavailable, it may be determined, based on some preset conditions, whether to select the CIIP mode as a final merge mode, and the CIIP mode may be directly determined as the target merge mode provided that any one of the preset conditions is not met. This reduces redundancy generated in a process of determining the target merge.

According to a fifth aspect, a picture prediction method is provided. The method includes: determining whether a merge mode is used for a current picture block; when the merge mode is used for the current picture block, continuing to determine whether a level-1 merge mode is available; when the level-1 merge mode is unavailable, and a high-layer syntax element corresponding to a first merge mode set indicates that a merge mode in the first merge mode set is forbidden to be used, determining a target merge mode applicable to the current picture block from a second merge mode set; and predicting the current picture block by using the target merge mode.

Both the first merge mode set and the second merge mode set belong to a level-2 merge mode. In other words, the level-2 merge mode includes the first merge mode set and the second merge mode set. In addition, for the current picture block, the level-1 merge mode and the level-2 merge mode already include all optional merge modes of the current picture block, and for the current picture block, a final target merge mode needs to be determined from the level-1 merge mode and the level-2 merge mode.

In an embodiment, the first merge mode set includes at least one merge mode, and the second merge mode set includes at least one merge mode.

It should be understood that the first merge mode set and the second merge mode set are merely concepts introduced for ease of description, and are mainly used to distinguish between different merge modes. In an actual process of determining the final target merge mode, the first merge mode set and the second merge mode set may not exist.

In this application, when high-layer syntax elements of some merge modes indicate that these merge modes are forbidden to be used, there is no need to parse available status information of these merge modes. Instead, the final target merge mode may be directly determined from remaining optional merge modes. This can reduce, as much as possible, redundancy generated due to determining of the target merge mode in a picture prediction process.

In an embodiment, when the level-1 merge mode is unavailable, and the high-layer syntax element corresponding to the first merge mode set indicates that the merge mode in the first merge mode set is allowed to be used, the target merge mode is determined based on a high-layer syntax element corresponding to the second merge mode set and/or available status information of the second merge mode set.

The available status information of the second merge mode set is used to indicate whether a merge mode in the second merge mode set is used when the current picture block is predicted.

For example, if the second merge mode set includes a CIIP mode, the available status information of the second merge mode set may be a value of ciip_flag. When ciip_flag is 0, the CIIP mode is unavailable for the current picture block. When ciip_flag is 1, the CIIP mode is available for the current picture block.

With reference to the fifth aspect, in some implementations of the fifth aspect, the first merge mode set includes a triangle partition mode TPM, and the second merge mode set includes a combined intra and inter prediction CIIP mode.

In an embodiment, the first merge mode set consists of the TPM mode, and the second mode set consists of the CIIP mode.

When the first merge mode set and the second merge mode each include only one merge mode, if the merge mode in the first merge mode set is forbidden to be used, the merge mode in the second merge mode set may be determined as the target merge mode; and if the merge mode in the second merge mode set is forbidden to be used, the merge in the first merge mode set may be determined as the target merge mode.

When the first merge mode set and the second merge mode set each include only one merge mode, as long as a merge mode in one of the merge mode sets is forbidden to be used, a merge mode in the other merge mode set may be directly determined as the final target merge mode.

In an embodiment, when the level-1 merge mode is unavailable, and the high-layer syntax element corresponding to the first merge mode set indicates that the merge mode in the first merge mode set is forbidden to be used, the determining a target merge mode applicable to the current picture block from a second merge mode set includes: when the level-1 merge mode is unavailable, and the high-layer syntax element corresponding to the TPM mode indicates that the TPM mode is forbidden to be used, determining the CIIP mode as the target merge mode.

According to a sixth aspect, a picture prediction apparatus is provided. The apparatus includes a module corresponding to the method according to any one of the first aspect to the fifth aspect, and the corresponding module can implement operations of the method according to any one of the first aspect to the fifth aspect.

The picture prediction apparatus in the sixth aspect may include one or more modules, and any one of the one or more modules may include any one of a circuit, a field programmable gate array FPGA, an application-specific integrated circuit ASIC, and a general-purpose processor.

The picture prediction apparatus in the sixth aspect may be located in an encoder apparatus or a decoding apparatus.

According to a seventh aspect, a picture prediction apparatus is provided, including a memory and a processor. The processor invokes program code stored in the memory to perform the method according to any one of the first aspect, the second aspect, and the third aspect.

The picture prediction apparatus in the seventh aspect may be located in a picture encoding apparatus or a picture decoding apparatus.

According to an eighth aspect, a picture encoding/decoding apparatus is provided. The apparatus includes a module corresponding to the method according to any one of the first aspect to the fifth aspect, and the corresponding module can implement operations of the method according to any one of the first aspect to the fifth aspect.

According to a ninth aspect, a picture encoding/decoding apparatus is provided, including a memory and a processor. The processor invokes program code stored in the memory to perform the method according to any one of the first aspect to the fifth aspect.

In an embodiment, the memory is a nonvolatile memory.

In an embodiment, the memory and the processor are coupled to each other.

According to a tenth aspect, an embodiment of this application provides a non-transitory computer-readable storage medium. The computer-readable storage medium stores an instruction, and the instruction enables one or more processors to perform the method according to any one of the first aspect to the fifth aspect.

Any one of the one or more processors may include any one of a circuit, a field programmable gate array FPGA, an application-specific integrated circuit ASIC, and a general-purpose processor.

According to an eleventh aspect, an embodiment of this application provides a computer program product. When the computer program product is run on a computer, the computer is enabled to perform some or all operations of the method according to any one of the first aspect to the fifth aspect.

DESCRIPTION OF EMBODIMENTS

Figure 1:
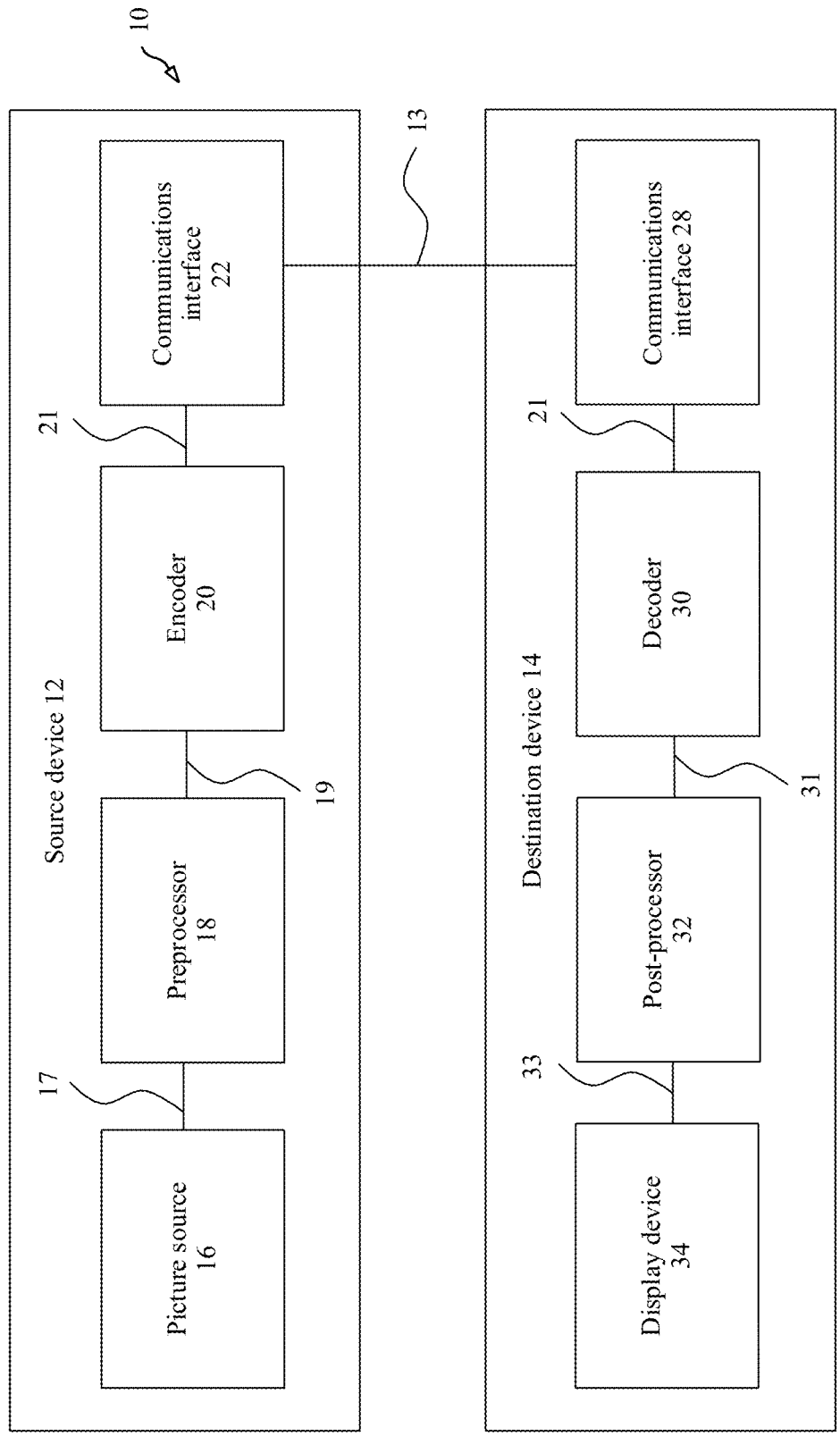
FIG. 1 is a schematic block diagram of an example of a video coding system according to an embodiment.

The following describes technical solutions of this application with reference to accompanying drawings.

In the following description, reference is made to the accompanying drawings that form a part of this application and show, by way of illustration, specific aspects of the embodiments of this application or specific aspects in which the embodiments of this application may be used. It should be understood that the embodiments of this application may further be used in another aspect, and may include structural or logical changes not depicted in the accompanying drawings. Therefore, the following detailed description shall not be taken in a limiting sense, and the scope of this application should be defined by the appended claims.

For example, it should be understood that a disclosure in connection with a described method may also hold true for a corresponding device or system configured to perform the method and vice versa.

For another example, if one or more method operations are described, a corresponding device may include one or more units such as functional units, to perform the described one or more method operations (for example, one unit performing the one or more operations; or a plurality of units each performing one or more of the plurality of operations), even if such one or more units are not explicitly described or illustrated in the accompanying drawings.

In addition, if a specific apparatus is described based on one or more units such as functional units, a corresponding method may include one operation used to perform a function of one or more units (for example, one operation used to perform the function of the one or more units, or a plurality of operations each used to perform the function of one or more of the plurality of units), even if such one or more operations are not explicitly described or illustrated in the accompanying drawings. Further, it should be understood that features of the various example embodiments and/or aspects described in this specification may be combined with each other, unless specifically noted otherwise.

The technical solutions in the embodiments of this application may be applied to the H.266 standard and a future video coding standard. Terms used in implementations of this application are merely intended to explain specific embodiments of this application, and are not intended to limit this application. The following first briefly describes related concepts in the embodiments of this application.

Video coding usually refers to processing a sequence of pictures that constitute a video or a video sequence. In the field of video coding, the terms "picture (picture)", "frame (frame)", and "image (image)" may be used as synonyms. Video coding used in this specification includes video encoding and video decoding. Video encoding is performed on a source side, and usually includes processing (for example, by compressing) an original video picture to reduce an amount of data for representing the video picture, for more efficient storage and/or transmission. Video decoding is performed on a destination side, and usually includes inverse processing relative to an encoder to reconstruct the video picture. "Coding" of a video picture in the embodiments should be understood as "encoding" or "decoding" of a video sequence. A combination of an encoding part and a decoding part is also referred to as CODEC (encoding and decoding).

A video sequence includes a series of pictures (picture), a picture is further split into slices, and a slice is further split into blocks. Video coding is performed by block. In some new video coding standards, a concept "block" is further extended. For example, a macroblock (MB) is introduced in the H.264 standard. The macroblock may further be split into a plurality of prediction blocks (partition) that can be used for predictive coding. In the high efficiency video coding (HEVC) standard, basic concepts such as "coding unit" (CU), "prediction unit" (PU), and "transform unit" (TU) are used. A plurality of block units are obtained through functional division, and are described by using a new tree-based structure. For example, a CU may be split into smaller CUs based on a quadtree, and the smaller CU may further be split, to generate a quadtree structure. The CU is a basic unit for splitting and encoding a coded picture. A PU and a TU also have similar tree structures. The PU may correspond to a prediction block, and is a basic unit for predictive coding. The CU is further split into a plurality of PUs based on a splitting pattern. The TU may correspond to a transform block, and is a basic unit for transforming a prediction residual. However, in essence, all of the CU, the PU, and the TU are conceptually blocks (or picture blocks).

For example, in HEVC, a CTU is split into a plurality of CUs by using a quadtree structure represented as a coding tree. A decision on whether to encode a picture area by using inter-picture (temporal) or intra-picture (spatial) prediction is made at a CU level. Each CU may further be split into one, two, or four PUs based on a PU splitting pattern. Inside one PU, a same prediction process is applied, and related information is transmitted to a decoder on a PU basis. After obtaining a residual block by applying the prediction process based on the PU splitting pattern, the CU may be partitioned into transform units (transform unit, TU) based on another quadtree structure similar to the coding tree used for the CU. In the recent development of video compression technologies, a quadtree plus binary tree (or quad-tree and binary tree (QTBT)) partition frame is used to partition a coding block. In a QTBT block structure, the CU may be square or rectangular.

In this specification, for ease of description and understanding, a to-be-encoded picture block in a current coded picture may be referred to as a current picture block. For example, in encoding, the current picture block is a block currently being encoded, and in decoding, the current picture block is a block currently being decoded. A decoded picture block, in a reference picture, used to predict the current picture block is referred to as a reference block. In other words, the reference block is a block that provides a reference signal for the current picture block, and the reference signal represents a pixel value in the picture block. A block that provides a prediction signal for the current picture block in the reference picture may be referred to as a prediction block, and the prediction signal represents a pixel value, a sampling value, or a sampling signal in the prediction block. For example, after traversing a plurality of reference blocks, an optimal reference block is found, and the optimal reference block provides prediction for the current picture block, and this block is referred to as a prediction block.

In a case of lossless video coding, original video pictures can be reconstructed, which means reconstructed video pictures have same quality as the original video pictures (assuming that no transmission loss or other data loss occurs during storage or transmission). In a case of lossy video coding, further compression is performed through, for example, quantization, to reduce an amount of data required for representing video pictures, and the video pictures cannot be completely reconstructed at a decoder side, which means quality of reconstructed video pictures is lower or poorer than that of the original video pictures.

Several H.261 video coding standards are for "lossy hybrid video codecs" (to be specific, spatial and temporal prediction in a sample domain is combined with 2D transform coding for applying quantization in a transform domain). Each picture of a video sequence is usually partitioned into a set of non-overlapping blocks, and coding is usually performed at a block level. In other words, at an encoder side, a video is usually processed, that is, encoded, at a block (video block) level. For example, a prediction block is generated through spatial (intra-picture) prediction and temporal (inter-picture) prediction, the prediction block is subtracted from a current picture block (block currently being processed or to be processed) to obtain a residual block, and the residual block is transformed in the transform domain and quantized to reduce an amount of data that is to be transmitted (compressed). At a decoder side, an inverse processing part relative to the encoder is applied to the encoded or compressed block to reconstruct the current picture block for representation. Furthermore, the encoder duplicates a decoder processing loop, so that the encoder and the decoder generate a same prediction (for example, an intra prediction and an inter prediction) and/or reconstruction, for processing, that is, for coding subsequent blocks.

The following describes a system architecture applicable to the embodiments of the present invention. FIG. 1 is a schematic block diagram of an example of a video encoding and decoding system 10 according to an embodiment. As shown in FIG. 1, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various embodiments, the source apparatus 12, the destination apparatus 14, or both the source apparatus 12 and the destination apparatus 14 may include one or more processors and a memory coupled to the one or more processors. The memory may include but is not limited to a read-only memory (ROM), a random access memory (RAM), an erasable programmable read-only memory (EPROM), a flash memory, or any other medium that may be configured to store required program code in a form of an instruction or a data structure and that can be accessed by a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, a vehicle-mounted computer, a wireless communications device, or the like.

Although FIG. 1 depicts the source device 12 and the destination device 14 as separate devices, a device embodiment may alternatively include both the source device 12 and the destination device 14 or functions of both the source device 12 and the destination device 14, that is, the source device 12 or a corresponding function and the destination device 14 or a corresponding function. In such an embodiment, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented through a link 13. The destination device 14 may receive the encoded video data from the source device 12 through the link 13. The link 13 may include one or more media or apparatuses capable of moving the encoded video data from the source device 12 to the destination device 14. In an example, the link 13 may include one or more communication media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission cables. The one or more communications media may be a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20. In an embodiment, the source device 12 may further include a picture source 16, a picture preprocessor 18, and a communications interface 22. In an embodiment, the encoder 20, the picture source 16, the picture preprocessor 18, and the communications interface 22 may be hardware components in the source device 12, or may be software programs in the source device 12. Descriptions are separately provided as follows:

The picture source 16 may include or be any type of picture capturing device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture); and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera, or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generating device. The external picture generating device is, for example, an external computer graphics processor, a computer, or a server. The interface may be any type of interface, for example, a wired or wireless interface or an optical interface, according to any proprietary or standardized interface protocol.

A picture may be regarded as a two-dimensional array or matrix of pixel elements (picture element). The pixel element in the array may also be referred to as a sample. A quantity of samples in horizontal and vertical directions (or axes) of the array or the picture defines a size and/or resolution of the picture. For representation of color, three color components are usually employed. To be specific, the picture may be represented as or include three sample arrays. For example, in an RBG format or a color space, a picture includes corresponding red, green, and blue sample arrays. However, in video coding, each pixel is usually represented in a luminance/chrominance format or a color space. For example, a picture in a YUV format includes a luminance component indicated by Y (sometimes indicated by L alternatively) and two chrominance components indicated by U and V. The luminance (luma) component Y represents brightness or gray level intensity (for example, both are the same in a gray-scale picture), and the two chrominance (chroma) components U and V represent chrominance or color information components. Correspondingly, the picture in the YUV format includes a luminance sample array of luminance sample values (Y) and two chrominance sample arrays of chrominance values (U and V). A picture in an RGB format may be transformed or converted into a YUV format and vice versa. This process is also referred to as color conversion or transform. If a picture is monochrome, the picture may include only a luminance sample array. In this embodiment, a picture transmitted by the picture source 16 to the picture processor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion (for example, from the RGB format to the YUV format), color correction, or denoising.

The encoder 20 (also referred to as a video encoder 20) is configured to receive the preprocessed picture data 19, and process the preprocessed picture data 19 by using a related prediction mode (such as a prediction mode in each embodiment of this specification), to provide encoded picture data 21 (structural details of the encoder 20 are further described below based on FIG. 2, FIG. 4, or FIG. 5). In some embodiments, the encoder 20 may be configured to perform each embodiment described below, to implement encoder-side application of the picture prediction method described in this application.

The communications interface 22 may be configured to receive the encoded picture data 21, and transmit the encoded picture data 21 to the destination device 14 or any other device (for example, a memory) through the link 13 for storage or direct reconstruction. The other device may be any device used for decoding or storage. The communications interface 22 may be, for example, configured to encapsulate the encoded picture data 21 into an appropriate format, for example, a data packet, for transmission over the link 13.

The destination device 14 includes a decoder 30. In an embodiment, the destination device 14 may further include a communications interface 28, a picture post-processor 32, and a display device 34. Descriptions are separately provided as follows:

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 through the link 13 between the source device 12 and the destination device 14 or through any type of network. The link 13 is, for example, a direct wired or wireless connection. The any type of network is, for example, a wired or wireless network or any combination thereof, or any type of private or public network, or any combination thereof. The communications interface 28 may be, for example, configured to decapsulate the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to establish a connection, and acknowledge and exchange any other information related to a communication link and/or data transmission such as encoded picture data transmission.

The decoder 30 (also referred to as the decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform each embodiment described below, to implement decoder-side application of the picture prediction method described in this application.

The picture post-processor 32 is configured to post-process the decoded picture data 31 (also referred to as reconstructed picture data) to obtain post-processed picture data 33. The post-processing performed by the picture post-processor 32 may include color format conversion (for example, from the YUV format to the RGB format), color correction, trimming, re-sampling, or any other processing. The picture post-processor 32 may further be configured to transmit the post-processed picture data 33 to the display device 34.

The display device 34 is configured to receive the post-processed picture data 33 to display a picture, for example, to a user or a viewer. The display device 34 may be or include any type of display for presenting a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other display.

Although FIG. 1 depicts the source device 12 and the destination device 14 as separate devices, a device embodiment may alternatively include both the source device 12 and the destination device 14 or the functionalities of both the source device 12 and the destination device 14, that is, the source device 12 or the corresponding functionality and the destination device 14 or the corresponding functionality. In such an embodiment, the source device 12 or the corresponding functionality and the destination device 14 or the corresponding functionality may be implemented by using same hardware and/or software, separate hardware and/or software, or any combination thereof.

As will be apparent for a person skilled in the art based on the descriptions, existence and (exact) division of functionalities of different units or functionalities of the source device 12 and/or the destination device 14 shown in FIG. 1 may vary depending on an actual device and application. The source device 12 and the destination device 14 may include any of a wide range of devices, including any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any of various suitable circuits, for example, one or more microprocessors, digital signal processors (DSP), application-specific integrated circuits (ASIC), field-programmable gate arrays (FPGA), discrete logic, hardware, or any combinations thereof. If the technologies are implemented partially by using software, a device may store a software instruction in a suitable non-transitory computer-readable storage medium and may execute the instruction by using hardware such as one or more processors, to perform the technologies of this specification. Any of the foregoing content (including hardware, software, a combination of hardware and software, and the like) may be considered as one or more processors.

In some cases, the video encoding and decoding system 10 shown in FIG. 1 is merely an example, and the technologies of this application may be applicable to video coding settings (for example, video encoding or video decoding) that do not necessarily include any data communication between an encoding device and a decoding device. In another example, data may be retrieved from a local memory, streamed over a network, or the like. A video encoding device may encode the data and store the data into a memory, and/or a video decoding device may retrieve the data from the memory and decode the data. In some examples, the encoding and decoding is performed by devices that do not communicate with each other but simply encode data to a memory and/or retrieve the data from the memory and decode the data.

Figure 2:
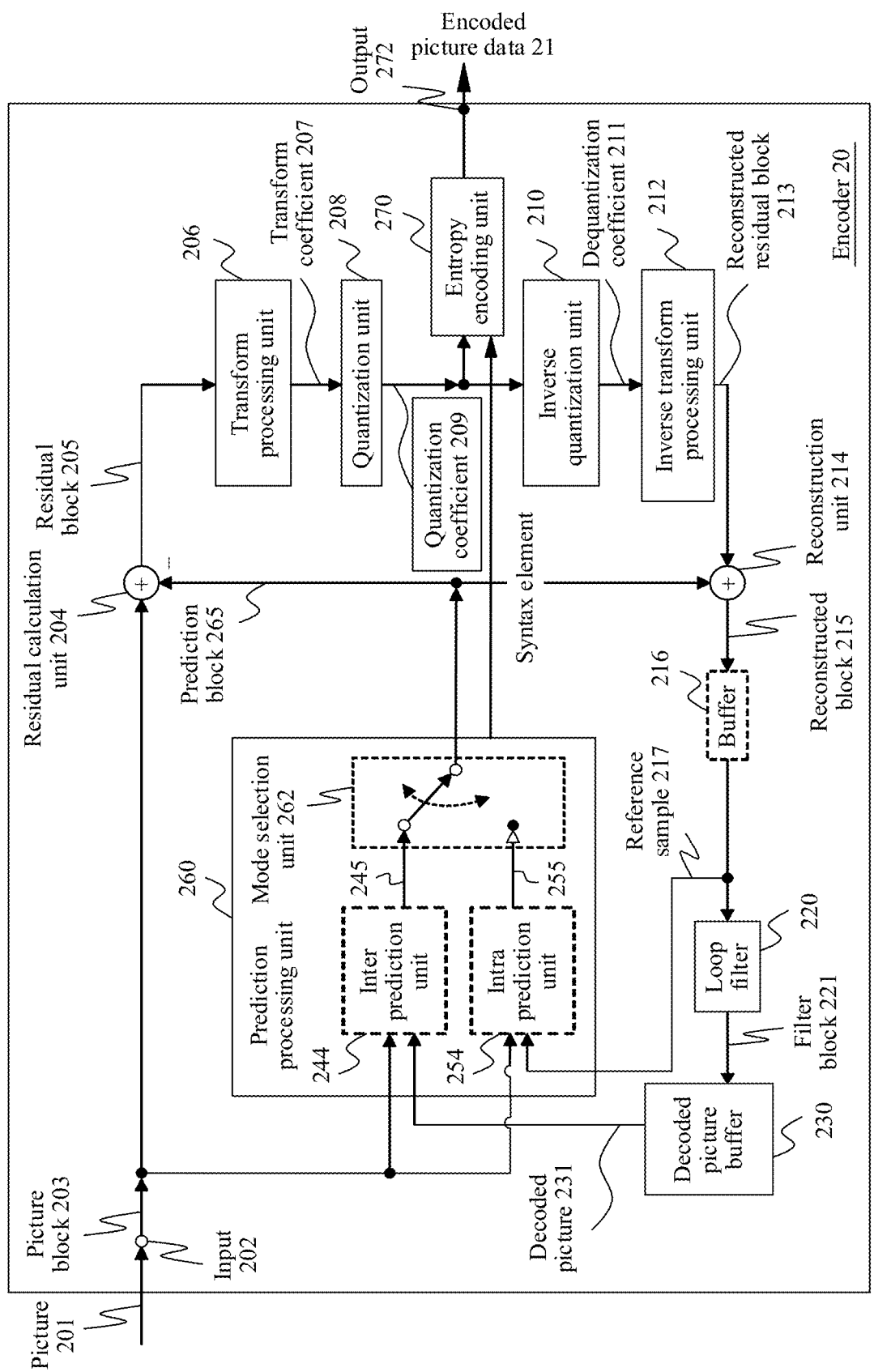
FIG. 2 is a schematic structural block diagram of an example of a video encoder according to an embodiment.

FIG. 2 is a schematic/conceptual block diagram of an example of an encoder 20 according to an embodiment. In the example of FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a reverse signal path of the encoder. The reverse signal path of the encoder corresponds to a signal path of a decoder (refer to a decoder 30 in FIG. 3).

The encoder 20 receives, for example, via an input 202, a picture 201 or a picture block 203 of the picture 201, for example, a picture in a sequence of pictures forming a video or a video sequence. The picture block 203 may also be referred to as a current picture block or a to-be-encoded picture block, and the picture 201 may be referred to as a current picture or a to-be-encoded picture (particularly in video coding, to distinguish the current picture from other pictures, for example, previously encoded and/or decoded pictures in a same video sequence, namely, the video sequence which also includes the current picture).

In an embodiment, the encoder 20 may include a partitioning unit (not shown in FIG. 2), configured to partition the picture 201 into a plurality of blocks such as the picture block 203. The picture 201 may be partitioned into a plurality of non-overlapping blocks. The partitioning unit may be configured to use a same block size for all pictures in a video sequence and a corresponding grid defining the block size, or change a block size between pictures or subsets or groups of pictures, and partition each picture into corresponding blocks.

In an embodiment, the prediction processing unit 260 of the encoder 20 may be configured to perform any combination of the partitioning technologies described above.

Like the picture 201, the picture block 203 is also or may be considered as a two-dimensional array or matrix of samples with sample values, although a size of the picture block 203 is smaller than a size of the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. A quantity of samples in horizontal and vertical directions (or axes) of the picture block 203 defines a size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture image block 203 and a prediction block 265 (details about the prediction block 265 are further provided below), for example, by subtracting sample values of the prediction block 265 from sample values of the picture image block 203 sample by sample (pixel by pixel), to obtain the residual block 205 in a sample domain.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. Compared with an orthogonal DCT transform, such integer approximations are usually scaled by a factor. To preserve a norm of a residual block which is processed by using forward and inverse transforms, an additional scale factor is applied as a part of the transform process. The scale factor is usually chosen based on some constraints, for example, the scale factor being a power of two for a shift operation, a bit depth of the transform coefficient, and a tradeoff between accuracy and implementation costs. For example, a specific scale factor is specified for the inverse transform by, for example, the inverse transform processing unit 212 at the decoder 30 side (and a corresponding inverse transform by, for example, the inverse transform processing unit 212 at the encoder 20 side), and correspondingly, a corresponding scale factor may be specified for the forward transform by the transform processing unit 206 at the encoder 20 side.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An appropriate quantization step may be indicated by a quantization parameter (QP). For example, the quantization parameter may be an index to a predefined set of appropriate quantization steps. For example, a smaller quantization parameter may correspond to the finer quantization (the smaller quantization step) and a larger quantization parameter may correspond to the coarser quantization (the larger quantization step), or vice versa. The quantization may include division by a quantization step and corresponding quantization or inverse quantization, for example, performed by the inverse quantization unit 210, or may include multiplication by a quantization step. Embodiments according to some standards such as HEVC may use a quantization parameter to determine the quantization step. Generally, the quantization step may be calculated based on a quantization parameter by using a fixed point approximation of an equation including division. Additional scale factors may be introduced for quantization and dequantization to restore the norm of the residual block, where the norm of the residual block may be modified because of a scale used in the fixed point approximation of the equation for the quantization step and the quantization parameter. In an example implementation, a scale of the inverse transform may be combined with a scale of the dequantization. Alternatively, a customized quantization table may be used and signaled from an encoder to a decoder, for example, in a bitstream. The quantization is a lossy operation, where a larger quantization step indicates a larger loss.

The inverse quantization unit 210 is configured to apply the inverse quantization of the quantization unit 208 to a quantized coefficient to obtain a dequantized coefficient 211, for example, apply, based on or by using a same quantization step as the quantization unit 208, the inverse of a quantization scheme applied by the quantization unit 208. The dequantized coefficient 211 may also be referred to as a dequantized residual coefficient 211, and correspond to the transform coefficient 207, although usually different from the transform coefficient due to a loss caused by quantization.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (namely, a reconstructed residual block 213) to the prediction block 265, for example, by adding sample values of the reconstructed residual block 213 and the sample values of the prediction block 265, to obtain a reconstructed block 215 in the sample domain.

In an embodiment, a buffer unit 216 ("buffer" 216 for short) of, for example, a line buffer 216, is configured to buffer or store the reconstructed block 215 and a corresponding sample value, for example, for intra prediction. In another embodiment, the encoder may be configured to use an unfiltered reconstructed block and/or a corresponding sample value that are/is stored in the buffer unit 216 for performing any type of estimation and/or prediction, for example, intra prediction.

For example, in an embodiment, the encoder 20 may be configured so that the buffer unit 216 is configured to store the reconstructed block 215 not only used for intra prediction 254 but also used for the loop filter unit 220 (not shown in FIG. 2), and/or so that, for example, the buffer unit 216 and the decoded picture buffer 230 form one buffer. In another embodiment, a filtered block 221 and/or a block or sample (not shown in FIG. 2) from the decoded picture buffer 230 are/is used as an input or a basis for intra prediction 254.

The loop filter unit (or loop filter) 220 is configured to filter the reconstructed block 215 to obtain the filtered block 221, to smooth pixel transition or improve video quality. The loop filter unit 220 is intended to represent one or more loop filters such as a deblocking filter, a sample-adaptive offset (SAO) filter, or another filter, for example, a bilateral filter, an adaptive loop filter (ALF), a sharpening or smoothing filter, or a collaborative filter. Although the loop filter unit 220 is shown as an in-loop filter in FIG. 2, in another implementation, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that, the decoder 30 can receive and apply the same loop filter parameter for decoding.

The decoded picture buffer (DPB) 230 may be a reference picture memory that stores reference picture data for use in video data encoding by the encoder 20. The DPB 230 may be formed by any one of a variety of memory devices such as a dynamic random access memory (DRAM) (including a synchronous DRAM (SDRAM)), a magnetoresistive RAM (MRAM), a resistive RAM (RRAM)), or another type of memory device. The DPB 230 and the buffer 216 may be provided by a same memory device or separate memory devices. In an example, the decoded picture buffer (DPB) 230 is configured to store the filtered block 221. The decoded picture buffer 230 may further be configured to store other previously filtered blocks, for example, previously reconstructed and filtered blocks 221, of the same current picture or of different pictures, for example, previously reconstructed pictures, and may provide complete previously reconstructed, that is, decoded pictures (and corresponding reference blocks and samples) and/or a partially reconstructed current picture (and corresponding reference blocks and samples), for example, for inter prediction. In an example, if the reconstructed block 215 is reconstructed without in-loop filtering, the decoded picture buffer (decoded picture buffer, DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the decoded picture buffer 230, and process such data for prediction, to be specific, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or in other words a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (rate distortion optimization, RDO), to be specific, select a prediction mode that provides minimum rate-distortion optimization or select a prediction mode for which related rate distortion at least satisfies a prediction mode selection criterion.

The following describes in detail prediction processing performed (for example, by the prediction processing unit 260) and mode selection performed (for example, by the mode selection unit 262) by an example of the encoder 20

As described above, the encoder 20 is configured to determine or select the optimal or optimum prediction mode from a set of (pre-determined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In an embodiment, a set of inter prediction modes depends on available reference pictures (namely, for example, at least partially decoded pictures stored in the DBP 230, as described above) and other inter prediction parameters, for example, depends on whether an entire reference picture or only a part of the reference picture, for example, a search window area around an area of the current picture block, is used to search for a best matching reference block, and/or for example, depends on whether pixel interpolation such as half-pel and/or quarter-pel interpolation is applied. The set of inter prediction modes may include, for example, an advanced motion vector (AMVP) mode and a merge mode. In an embodiment, the set of inter prediction modes may include an improved control point-based AMVP mode and an improved control point-based merge mode in the embodiments of this application. In an example, the intra prediction unit 254 may be configured to perform any combination of inter prediction technologies described below.

In addition to the foregoing prediction modes, a skip mode and/or a direct mode may also be applied in the embodiments of this application.

The prediction processing unit 260 may further be configured to partition the picture block 203 into smaller block partitions or subblocks, for example, by iteratively using quad-tree (QT) partitioning, binary-tree (BT) partitioning, triple-tree (TT) partitioning, or any combination thereof, and perform, for example, prediction on each of the block partitions or subblocks. Mode selection includes selection of a tree structure of the partitioned picture block 203 and selection of a prediction mode applied to each of the block partitions or subblocks.

The inter prediction unit 244 may include a motion estimation (ME) unit (not shown in FIG. 2) and a motion compensation (MC) unit (not shown in FIG. 2). The motion estimation unit is configured to receive or obtain the picture image block 203 (the current picture image block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and the previously decoded pictures 31, or in other words, the current picture and the previously decoded pictures 31 may be a part of or form a sequence of pictures forming the video sequence.

For example, the encoder 20 may be configured to select a reference block from a plurality of reference blocks of a same picture or different pictures of a plurality of other pictures, and provide a reference picture and/or an offset (a spatial offset) between a location (X, Y coordinates) of the reference block and a location of the current picture block as inter prediction parameters to the motion estimation unit (not shown in FIG. 2). The offset is also referred to as a motion vector (motion vector, MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include fetching or generating the prediction block based on a motion/block vector determined through motion estimation (possibly performing interpolation in sub-pixel precision). Interpolation filtering may generate additional pixel samples from known pixel samples, thereby potentially increasing a quantity of candidate prediction blocks that may be used to code a picture block. Upon receiving a motion vector for a PU of the current picture block, a motion compensation unit 246 may locate a prediction block to which the motion vector points in one of the reference picture lists. The motion compensation unit 246 may also generate a syntax element associated with a block and a video slice, so that the decoder 30 uses the syntax element to decode the picture block in the video slice.

In an embodiment, the inter prediction unit 244 may transmit the syntax element to the entropy encoding unit 270. The syntax element includes the inter prediction parameter (such as indication information of selection of an inter prediction mode used for prediction of the current picture block after traversal of a plurality of inter prediction modes). In a possible application scenario, if there is only one inter prediction mode, the inter prediction parameter may alternatively not be carried in the syntax element. In this case, the decoder side 30 may directly perform decoding by using a default prediction mode. It may be understood that the inter prediction unit 244 may be configured to perform any combination of inter prediction technologies.

The intra prediction unit 254 is configured to obtain, for example, receive, a picture block 203 (the current picture block) and one or more previously reconstructed blocks, for example, reconstructed neighboring blocks, of a same picture for intra estimation. The encoder 20 may be, for example, configured to select an intra prediction mode from a plurality of (predetermined) intra prediction modes.

In an embodiment, the encoder 20 configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra prediction mode for a block, the intra prediction unit 254 is further configured to provide the intra prediction parameter, namely, information indicating the selected intra prediction mode for the block, to the entropy encoding unit 270. In an example, the intra prediction unit 254 may be configured to perform any combination of intra prediction technologies.

In an embodiment, the intra prediction unit 254 may transmit the syntax element to the entropy encoding unit 270. The syntax element includes the intra prediction parameter (such as indication information of selection of an intra prediction mode used for prediction of the current picture block after traversal of a plurality of intra prediction modes). In a possible application scenario, if there is only one intra prediction mode, the intra prediction parameter may alternatively not be carried in the syntax element. In this case, the decoder side 30 may directly perform decoding by using a default prediction mode.

The entropy encoding unit 270 is configured to apply (or not apply) an entropy encoding algorithm or scheme (for example, a variable-length coding (VLC) scheme, a context adaptive VLC (CAVLC) scheme, an arithmetic coding scheme, a context adaptive binary arithmetic coding (CABAC), a syntax-based context-adaptive binary arithmetic coding (SBAC), a probability interval partitioning entropy (PIPE) coding, or another entropy encoding methodology or technology) to one or all of the quantized residual coefficient 209, the inter prediction parameter, the intra prediction parameter, and/or the loop filter parameter, to obtain encoded picture data 21 that may be output via an output 272, for example, in a form of an encoded bitstream 21. The encoded bitstream may be transmitted to the video decoder 30, or archived for later transmission or retrieval by the video decoder 30. The entropy encoding unit 270 may further be configured to entropy encode another syntax element for a current video slice being encoded.

Another structural variant of the video encoder 20 can be used to encode a video stream. For example, a non-transform based encoder 20 may directly quantize a residual signal without the transform processing unit 206 for some blocks or frames. In another embodiment, the encoder 20 may have the quantization unit 208 and the inverse quantization unit 210 combined into a single unit.

In an embodiment, the encoder 20 may be configured to implement a video encoding process described in the following embodiments.

It should be understood that the video encoder in this application may include only some modules in the video encoder 20. For example, the video encoder in this application may include a picture decoding unit and a partitioning unit. The picture decoding unit may include one or more of an entropy decoding unit, a prediction unit, an inverse transform unit, and an inverse quantization unit.

In addition, another structural variant of the video encoder 20 can be used to encode a video stream. For example, for some picture blocks or picture frames, the video encoder 20 may directly quantize a residual signal, processing by the transform processing unit 206 is not required, and correspondingly, processing by the inverse transform processing unit 212 is not required either. Alternatively, for some picture blocks or picture frames, the video encoder 20 does not generate residual data, and correspondingly, processing by the transform processing unit 206, the quantization unit 208, the inverse quantization unit 210, and the inverse transform processing unit 212 is not required. Alternatively, the video encoder 20 may directly store a reconstructed picture block as a reference block, and processing by the filter 220 is not required. Alternatively, the quantization unit 208 and the inverse quantization unit 210 in the video encoder 20 may be combined. The loop filter 220 is optional. In addition, in a case of lossless compression encoding, the transform processing unit 206, the quantization unit 208, the inverse quantization unit 210, and the inverse transform processing unit 212 are optional. It should be understood that in different application scenarios, the inter prediction unit 244 and intra prediction unit 254 may be used selectively.

Figure 3:
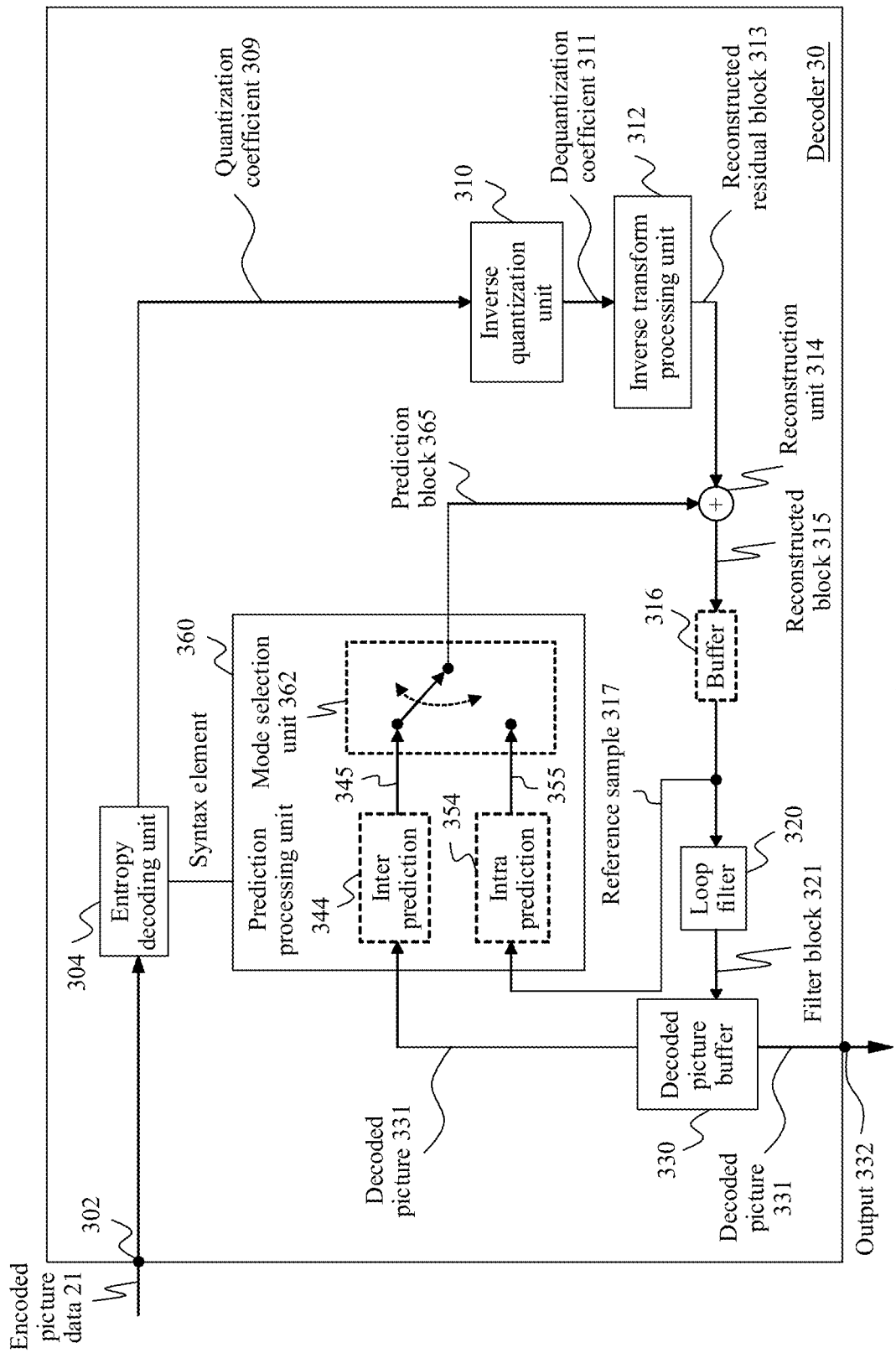
FIG. 3 is a schematic structural block diagram of an example of a video decoder according to an embodiment.

FIG. 3 is a schematic/conceptual block diagram of an example of a decoder 30 according to an embodiment. The video decoder 30 is configured to receive encoded picture data (for example, an encoded bitstream) 21 encoded by, for example, the encoder 20, to obtain a decoded picture 231. In a decoding process, the video decoder 30 receives video data from the video encoder 20, for example, an encoded video bitstream that represents a picture block of an encoded video slice and an associated syntax element.

In the example of FIG. 3, the decoder 30 includes an entropy decoding unit 304, an inverse quantization unit 310, an inverse transform processing unit 312, a reconstruction unit 314 (for example, a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some embodiments, the video decoder 30 may perform a decoding pass generally reciprocal to the encoding pass described with reference to the video encoder 20 in FIG. 2.

The entropy decoding unit 304 is configured to perform entropy decoding on the encoded picture data 21 to obtain, for example, a quantized coefficient 309 and/or a decoded encoding parameter (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 110. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may resemble the inter prediction unit 244 in function, and the intra prediction unit 354 may resemble the intra prediction unit 254 in function. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When the video slice is encoded into an intra-encoded (I) slice, the intra prediction unit 354 of the prediction processing unit 360 is configured to generate the prediction block 365 for a picture block of the current video slice based on a signaled intra prediction mode and data of a previously decoded block of a current frame or picture. When the video frame is encoded into an inter encoded (namely, B or P) slice, the inter prediction unit 344 (for example, a motion compensation unit) in the prediction processing unit 360 is configured to generate a prediction block 365 of a video block in the current video slice based on a motion vector and the another syntax element that is received from the entropy decoding unit 304. For inter prediction, the prediction block may be generated from one of reference pictures in one reference picture list. The video decoder 30 may construct reference frame lists, a list 0 and a list 1, by using a default construction technology and based on reference pictures stored in the DPB 330.

The prediction processing unit 360 is configured to determine prediction information for a video block of the current video slice by parsing the motion vector and the other syntax elements, and use the prediction information to generate the prediction block for the current video block being decoded. In an example of this application, the prediction processing unit 360 determines, by using some received syntax elements, a prediction mode (for example, intra or inter prediction) for encoding the video block in the video slice, an inter prediction slice type (for example, a B slice, a P slice, or a GPB slice), construction information of one or more of the reference picture lists for the slice, a motion vector of each inter encoded video block for the slice, an inter prediction status of each inter encoded video block in the slice, and other information, to decode the video block in the current video slice. In another example of this application, the syntax element received by the video decoder 30 from the bitstream includes a syntax element in one or more of an adaptive parameter set (APS), a sequence parameter set (SPS), a picture parameter set (PPS), or a slice header.

The inverse quantization unit 310 may be configured to perform inverse quantization (namely, dequantization) on a quantized transform coefficient provided in the bitstream and decoded by the entropy decoding unit 304. An inverse quantization process may include: using a quantization parameter calculated by the video encoder 20 for each video block in the video slice, to determine a quantization degree that should be applied and, likewise, an inverse quantization degree that should be applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, a summator 314) is configured to add an inverse transform block 313 (namely, a reconstructed residual block 313) to the prediction block 365, for example, by adding sample values of the reconstructed residual block 313 and sample values of the prediction block 365, to obtain a reconstructed block 315 in a sample domain.

The loop filter unit 320 (in a coding loop or after a coding loop) is configured to filter the reconstructed block 315 to obtain a filtered block 321, to smooth pixel transitions or improve video quality. In an example, the loop filter unit 320 may be configured to perform any combination of filtering technologies described below. The loop filter unit 320 is intended to represent one or more loop filters such as a deblocking filter, a sample-adaptive offset (SAO) filter, or another filter, for example, a bilateral filter, an adaptive loop filter (ALF), a sharpening or smoothing filter, or a collaborative filter. Although the loop filter unit 320 is shown as an in-loop filter in FIG. 3, in another implementation, the loop filter unit 320 may be implemented as a post-loop filter.

Then, a decoded video block 321 in a given frame or picture is stored in the decoded picture buffer 330 that stores a reference picture used for subsequent motion compensation.

The decoder 30 is configured to, for example, output the decoded picture 31 via an output 332, for presentation or viewing to a user.

Another embodiment of the video decoder 30 may be used to decode a compressed bitstream. For example, the decoder 30 may generate an output video stream without the loop filter unit 320. For example, a non-transform based decoder 30 may directly inverse-quantize a residual signal without the inverse transform processing unit 312 for some blocks or frames. In another implementation, the video decoder 30 may have the inverse quantization unit 310 and the inverse transform processing unit 312 combined into a single unit.

In an embodiment, the decoder 30 is configured to implement a video decoding method described in the following embodiments.

It should be understood that the video encoder in this application may include only some modules in the video encoder 30. For example, the video encoder in this application may include a partitioning unit and a picture coding unit. The picture coding unit may include one or more of a prediction unit, a transform unit, a quantization unit, and an entropy encoding unit.

In addition, another structural variant of the video decoder 30 can be used to decode an encoded video bitstream. For example, the video decoder 30 may generate an output video stream without processing by the filter 320. Alternatively, for some picture blocks or picture frames, the entropy decoding unit 304 of the video decoder 30 does not obtain quantized coefficients through decoding, and correspondingly, there is no need for the inverse quantization unit 310 and the inverse transform processing unit 312 to perform processing. The loop filter 320 is optional. In addition, in a case of lossless compression, the inverse quantization unit 310 and the inverse transform processing unit 312 are also optional. It should be understood that in different application scenarios, the inter prediction unit and the intra prediction unit may be used selectively.

It should be understood that, in the encoder 20 and the decoder 30 in this application, a processing result for a procedure may be output to a next procedure after being further processed. For example, after a procedure such as interpolation filtering, motion vector derivation, or loop filtering, an operation such as clip or shift is further performed on a processing result of the corresponding procedure.

For example, a motion vector that is of a control point of a current picture block and that is derived based on a motion vector of a neighboring affine coding block (a coding block that is predicted by using an affine motion model may be referred to as an affine coding block) or a motion vector that is of a subblock of the current picture block and that is derived based on the motion vector of the neighboring affine coding block may further be processed. This is not limited in this application. For example, a value of the motion vector is constrained to be within a specific bit width range. It is assumed that an allowed bit width of the motion vector is bitDepth, the value of the motion vector ranges from $-2^{(bitDepth-1)}$ to $2^{(bitDepth-1)}-1$, where the symbol "^" represents exponentiation. If bitDepth is 16, the value ranges from −32768 to 32767. If bitDepth is 18, the value ranges from −131072 to 131071.

For another example, the value of the motion vector (for example, motion vectors MVs of four 4×4 subblocks within one 8×8 picture block) may further be constrained, so that a maximum difference between integer parts of the MVs of the four 4×4 subblocks does not exceed N (for example, N may be set to 1) pixels.

Figure 4:
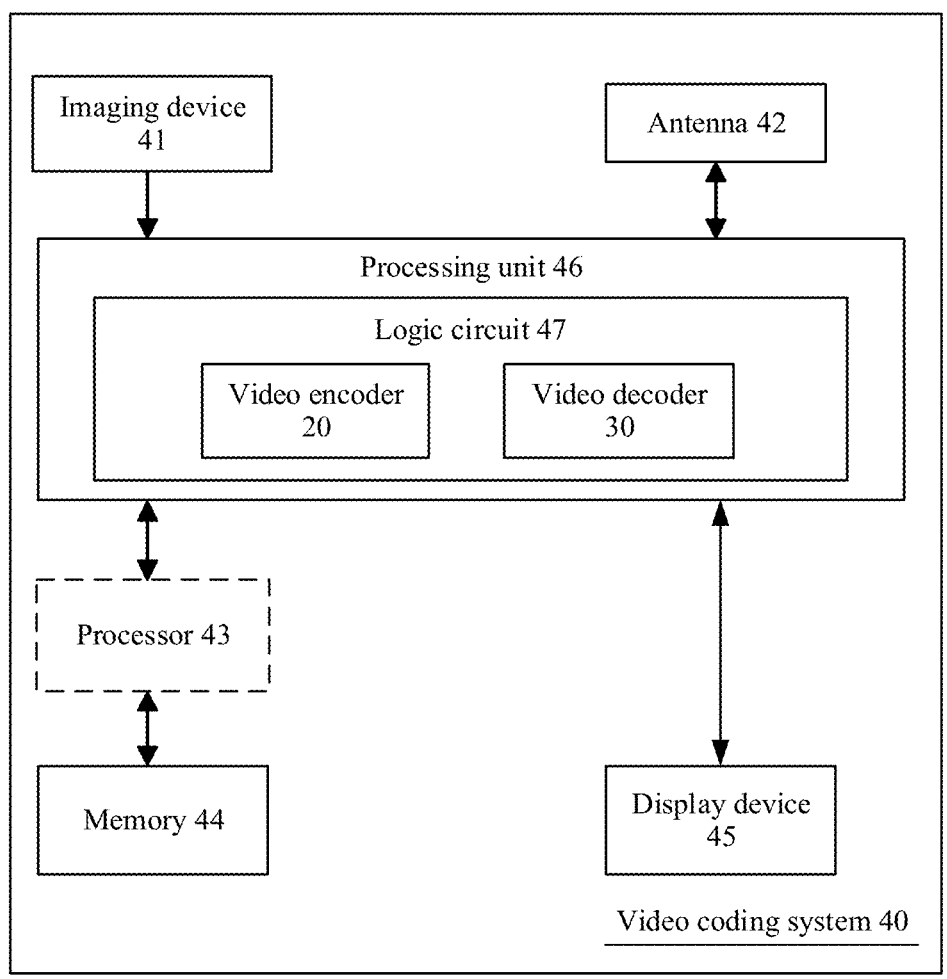
FIG. 4 is a schematic structural block diagram of an example of a video coding system according to an embodiment.

FIG. 4 is an illustrative diagram of an example of a video coding system 40 including the encoder 20 in FIG. 2 and/or the decoder 30 in FIG. 3 according to an embodiment. The video coding system 40 can implement a combination of various technologies in the embodiments of this application.

In the illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 4, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. Further, in some examples, the display device 45 may be configured to present the video data. In some examples, the logic circuit 47 may be implemented by the processing unit 46. The processing unit 46 may include an application-specific integrated circuit (ASIC) logic, a graphics processor, a general-purpose processor, or the like. The video coding system 40 may also include processor 43 (which may be optional in some embodiments). The processor 43 may similarly include an application-specific integrated circuit (ASIC) logic, a graphics processor, a general-purpose processor, or the like. In some examples, the logic circuit 47 may be implemented by hardware, for example, dedicated hardware for video coding. The processor 43 may be implemented by general-purpose software, an operating system, or the like. In addition, the memory 44 may be a memory of any type, for example, a volatile memory (for example, a static random access memory (SRAM) or a dynamic random access memory (DRAM)) or a nonvolatile memory (for example, a flash memory). In an embodiment, the memory 44 may be implemented as a cache memory. In some examples, the logic circuit 47 may access the memory 44 (for example, for implementation of a picture buffer). In another example, the logic circuit 47 and/or the processing unit 46 may include a memory (for example, a cache) for implementation of a picture buffer or the like.

In some examples, the encoder 20 implemented by the logic circuit may include a picture buffer (for example, implemented by the processing unit 46 or the memory 44) and a graphics processing unit (for example, implemented by the processing unit 46). The graphics processing unit may be communicatively coupled to the picture buffer. The graphics processing unit may include the encoder 20 implemented by the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by the logic circuit may include a picture buffer (for example, implemented by the processing unit 2820 or the memory 44) and a graphics processing unit (for example, implemented by the processing unit 46). The graphics processing unit may be communicatively coupled to the picture buffer. The graphics processing unit may include the decoder 30 implemented by the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like that is related to video frame encoding and that is described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment of this application, for the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy encode the syntax element into an encoded video bitstream. In such examples, the decoder 30 may parse the syntax element and correspondingly decode the related video data.

Figure 5:
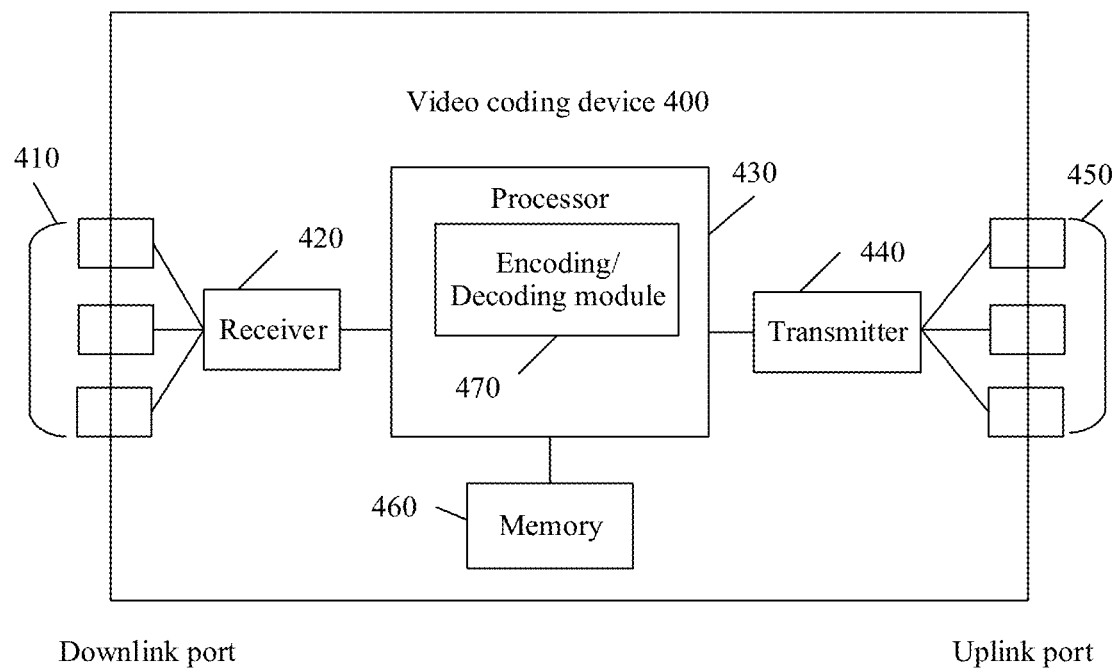
FIG. 5 is a schematic structural block diagram of an example of a video coding device according to an embodiment.

FIG. 5 is a schematic structural diagram of a video coding device 400 (for example, a video encoding device 400 or a video decoding device 400) according to an embodiment. The video coding device 400 is suitable for implementing the embodiments described in this specification. In an embodiment, the video coding device 400 may be a video decoder (for example, the decoder 30 in FIG. 3) or a video encoder (for example, the encoder 20 in FIG. 2). In another embodiment, the video coding device 400 may be one or more components of the decoder 30 in FIG. 3 or the encoder 20 in FIG. 2.

The video coding device 400 includes: ingress ports 410 and a receiving unit (Rx) 420 that are configured to receive data; a processor, a logic unit, or a central processing unit (CPU) 430 that is configured to process the data; a transmitter unit (Tx) 440 and egress ports 450 that are configured to transmit the data; and a memory 460 configured to store the data. The video coding device 400 may further include an optical-to-electrical component and an electrical-to-optical (EO) component coupled to the ingress ports 410, the receiver unit 420, the transmitter unit 440, and the egress ports 450 for egress or ingress of an optical or electrical signal.

The processor 430 is implemented by hardware and software. The processor 430 may be implemented as one or more CPU chips, cores (for example, a multi-core processor), FPGAs, ASICs, and DSPs. The processor 430 communicates with the ingress ports 410, the receiver unit 420, the transmitter unit 440, the egress ports 450, and the memory 460. The processor 430 includes a coding module 470 (for example, an encoding module 470 or a decoding module 470). The encoding/decoding module 470 implements the embodiments disclosed in this specification, to implement the picture prediction method provided in the embodiments of the present invention. For example, the encoding/decoding module 470 performs, processes, or provides various coding operations. Therefore, the encoding/decoding module 470 substantially improves functions of the video coding device 400 and affects transform of the video coding device 400 to a different state. Alternatively, the encoding/decoding module 470 is implemented as an instruction stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or nonvolatile, and may be a read-only memory (ROM), a random access memory (RAM), a random access memory (ternary content-addressable memory, TCAM), and/or a static random access memory (SRAM).

Figure 6:
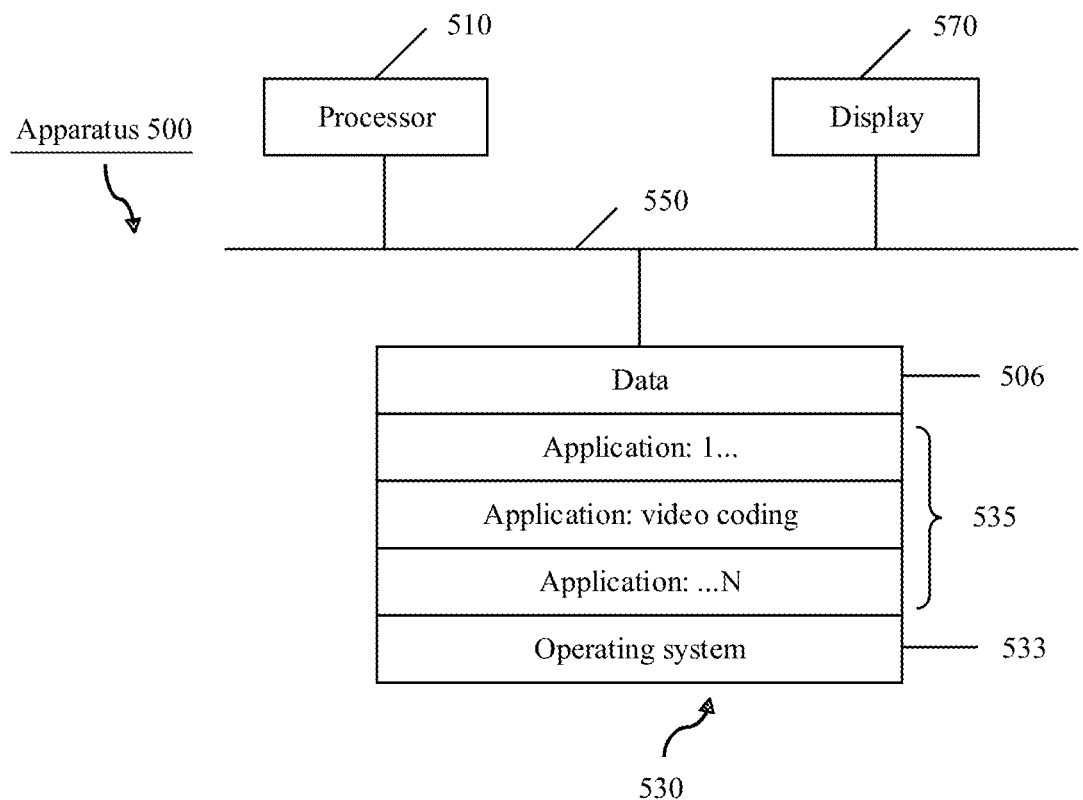
FIG. 6 is a schematic block diagram of an example of an encoding apparatus or a decoding apparatus according to an embodiment.

FIG. 6 is a simplified block diagram of an apparatus 500 that may be used as either or two of the source device 12 and the destination device 14 in FIG. 1 according to an embodiment. The apparatus 500 may implement the picture prediction method in the embodiments of this application. In other words, FIG. 6 is a schematic block diagram of an implementation of an encoding device or a decoding device (referred to as a coding device 500 for short) according to an embodiment of this application. The coding device 500 may include a processor 510, a memory 530, and a bus system 550. The processor and the memory are connected through the bus system. The memory is configured to store an instruction. The processor is configured to execute the instruction stored in the memory. The memory of the coding device stores program code. The processor may invoke the program code stored in the memory, to perform various video encoding or decoding methods described in this application, particularly various new picture block partitioning methods. To avoid repetition, details are not described herein again.

In this embodiment, the processor 510 may be a central processing unit (CPU). Alternatively, the processor 510 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The memory 530 may include a read-only memory (ROM) device or a random access memory (RAM) device. Any other suitable type of storage device may alternatively be used as the memory 530. The memory 530 may include code and data 531 accessed by the processor 510 through the bus 550. The memory 530 may further include an operating system 533 and an application program 535. The application program 535 includes at least one program that allows the processor 510 to perform the video encoding or decoding method described in this application. For example, the application program 535 may include applications 1 to N, and further include a video encoding or decoding application (referred to as a video coding application for short) that performs the video encoding or decoding method described in this application.

In addition to a data bus, the bus system 550 may further include a power bus, a control bus, a status signal bus, and the like. However, for clear description, various types of buses in the figure are marked as the bus system 550.

In an embodiment, the coding device 500 may further include one or more output devices, for example, a display 570. In an example, the display 570 may be a touch display that combines a display and a touch unit that operably senses a touch input. The display 570 may be connected to the processor 510 through the bus 550.

To better understand the picture prediction method in the embodiments of this application, the following first describes in detail some related concepts and basic content of inter prediction.

Inter prediction means searching a reconstructed picture for a matched reference block for a current picture block in a current picture, and using a pixel value of a pixel element in the reference block as a predictor of a pixel value of a pixel element in the current picture block, (This process is referred to as motion estimation (Motion estimation, ME)).

Motion estimation is to try a plurality of reference blocks in a reference picture for a current picture block, and then finally determine one or two reference blocks (two reference blocks are required for bi-prediction) from the plurality of reference blocks by using rate-distortion optimization (RDO) or another method. The reference block is used to perform inter prediction on the current picture block.

Motion information of the current picture block includes indication information of a prediction direction (which is usually forward prediction, backward prediction, or bi-prediction), one or two motion vectors (MV) pointing to the reference block, indication information of the picture in which the reference block is located (which is usually represented by using a reference index (reference index)).

Forward prediction means selecting a reference picture from a forward reference picture set, to obtain a reference block for a current picture block. Backward prediction means selecting a reference picture from a backward reference picture set, to obtain a reference block for a current picture block. Bi-prediction means selecting a reference picture from a forward reference picture set and a reference picture from a backward reference picture set, to obtain a reference block. When a bi-prediction method is used, there are two reference blocks in a current coding block. Each reference block needs to be indicated by using a motion vector and a reference index. Then, a predictor of a pixel value of a pixel element in the current picture block is determined based on pixel values of pixel elements in the two reference blocks.

In HEVC, there are two inter prediction modes: an AMVP mode and a merge mode.

In the AMVP mode, spatially or temporally neighboring encoded blocks (denoted as neighboring blocks) of a current coding block are first traversed. A candidate motion vector list is constructed based on motion information of the neighboring blocks. Then, an optimal motion vector is determined from the candidate motion information list based on a rate-distortion cost, and candidate motion information with a minimum rate-distortion cost is used as a motion vector predictor (MVP) of the current coding block.

Locations and a traversal order of the neighboring blocks are predefined. The rate-distortion cost may be obtained through calculation by using a formula (1), where J is the rate-distortion cost (rate-distortion cost), SAD is a sum of absolute differences (sum of absolute differences, SAD) between an original pixel value and a predicted pixel value that is obtained through motion estimation performed by using the candidate motion vector predictor, R is a bit rate, and λ is a Lagrange multiplier. An encoder side transfers, to a decoder side, an index value and a reference index value of the selected motion vector predictor in the candidate motion vector list. Further, the encoder side may perform motion search in a neighborhood centered on the MVP to obtain an actual motion vector of the current coding block, and then transfer a difference (motion vector difference) between the MVP and the actual motion vector to the decoder side.

$$J = SAD + \lambda R \quad (1)$$

In addition, in terms of different motion models, the AMVP mode may be classified into a translational model-based AMVP mode and a non-translational model-based AMVP mode.

In the merge mode, a candidate motion information list is first constructed based on motion information of a spatially or temporally encoded unit of a current coding unit. Then, optimal motion information is determined from the candidate motion information list as motion information of the current coding unit based on a rate-distortion cost. Finally, an index value (denoted as a merge index hereinafter) of a location of the optimal motion information in the candidate motion information list is transferred to the decoder side.

Figure 7:
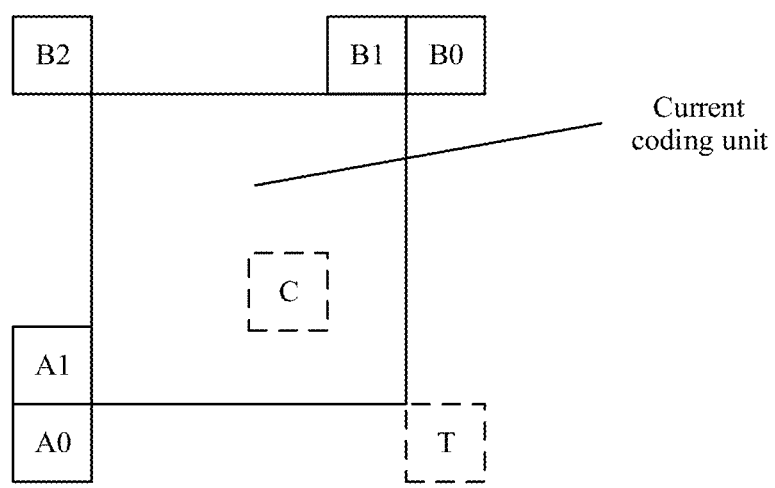
FIG. 7 is a schematic diagram of spatial and temporal candidate motion information of a current coding unit.

In the merge mode, spatial and temporal candidate motion information of the current coding unit may be shown in FIG. 7. The spatial candidate motion information comes from five spatially neighboring blocks (A0, A1, B0, B1, and B2). If the neighboring blocks are unavailable or a prediction mode is intra prediction, the neighboring blocks are not added to the candidate motion information list.

The temporal candidate motion information of the current coding unit may be obtained by scaling an MV of a block at a corresponding location in a reference frame based on picture order counts (picture order count, POC) of the reference frame and a current frame. When the block at the corresponding location in the reference frame is obtained, it may be first determined whether a block at a location T in the reference frame is available. If the block at the location T is unavailable, a block at a location C is selected.

When a translational model is used for prediction, same motion information is used for all pixels in a coding unit, and then motion compensation is performed based on the motion information, to obtain a predictor of a pixel in the coding unit. However, in the real world, there are a variety of motions. Many objects, for example, a rotating object, a roller coaster rotating in different directions, fireworks, and some stunts in movies, are not in translational motion. If these moving objects, especially those in a user generated content (user generated content, UGC) scenario, are encoded by using a block motion compensation technology based on the translational motion model in a current coding standard, coding efficiency is greatly affected. Therefore, to improve an encoding effect, non-translational motion model-based prediction is provided.

In non-translational motion model-based prediction, a same motion model is used on an encoder side and a decoder side to derive motion information of each sub-motion compensation unit in a current coding block, and then motion compensation is performed based on the motion information of the sub-motion compensation unit to obtain a prediction subblock of each subblock, to improve prediction efficiency. Frequently used non-translational motion models include a 4-parameter affine motion model and a 6-parameter affine motion model.

In addition, a skip mode is a special mode of the merge mode. A difference lies in that there is no residual during transmission in the skip mode, and only a merge candidate index (merge index) is transferred. The merge index is used to indicate best or target candidate motion information in a merge candidate motion information list.

Different modes may be used when a picture is predicted. The following describes these common modes in detail.

Merge with motion vector difference mode:

In the merge with motion vector difference (MMVD) mode, one or more candidate motion vectors are selected from a merge candidate motion vector list, and then motion vector (MV) extension expression is performed based on the candidate motion vectors. The MV extension expression includes a start point of an MV, a motion step, and a motion direction.

Generally, a type of a candidate motion vector selected in the MMVD mode is a default merge type (for example, MRG_TYPE_DEFAULT_N). The selected candidate motion vector is the start point of the MV. In other words, the selected candidate motion vector is used to determine an initial location of the MV.

As shown in Table 1, a base candidate index (Base candidate IDX) indicates which candidate motion vector is selected from the candidate motion vector list as an optimal candidate motion vector. If the merge candidate motion vector list includes one candidate motion vector for selection, the base candidate IDX may not be determined.

TABLE 1

| | Base candidate index | | | |
|---|---|---|---|---|
| | 0 | 1 | 2 | 3 |
| $N^{th}$ MVP | $1^{st}$ MVP | $2^{nd}$ MVP | $3^{rd}$ MVP | $4^{th}$ MVP |

For example, if the base candidate index is 1, the selected candidate motion vector is the second motion vector in the merge candidate motion vector list.

A distance index (Distance IDX) represents offset distance information of a motion vector. A value of the distance index represents a distance (for example, a preset distance) offset from the initial location. The distance herein is represented by a pixel distance (Pixel distance). The pixel distance may further be briefly referred to as pel. A correspondence between the distance index and the pixel distance may be shown in Table 2.

TABLE 2

| | Distance index | | | | | | | |
|---|---|---|---|---|---|---|---|---|
| | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

A direction index (Direction IDX) is used to represent a direction of a motion vector difference (MVD) based on the initial location. The direction index may include four cases in total. A specific definition may be shown in Table 3.

TABLE 3

| | Direction index | | | |
|---|---|---|---|---|
| | 00 | 01 | 10 | 11 |
| X-axis | + | − | N/A | N/A |
| Y-axis | N/A | N/A | + | − |

A process of determining a predicted pixel value of a current picture block based on the MMVD manner includes the following operations:

Operation 1: Determine a start point of an MV based on a base candidate IDX.

Figure 8:
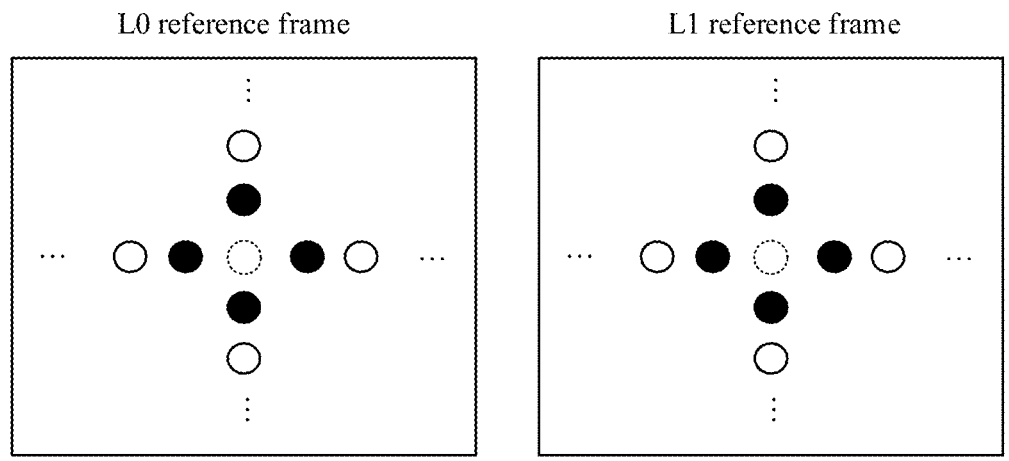
FIG. 8 is a schematic diagram of a merge with motion vector difference (MMVD) search point according to an embodiment.
Figure 9:
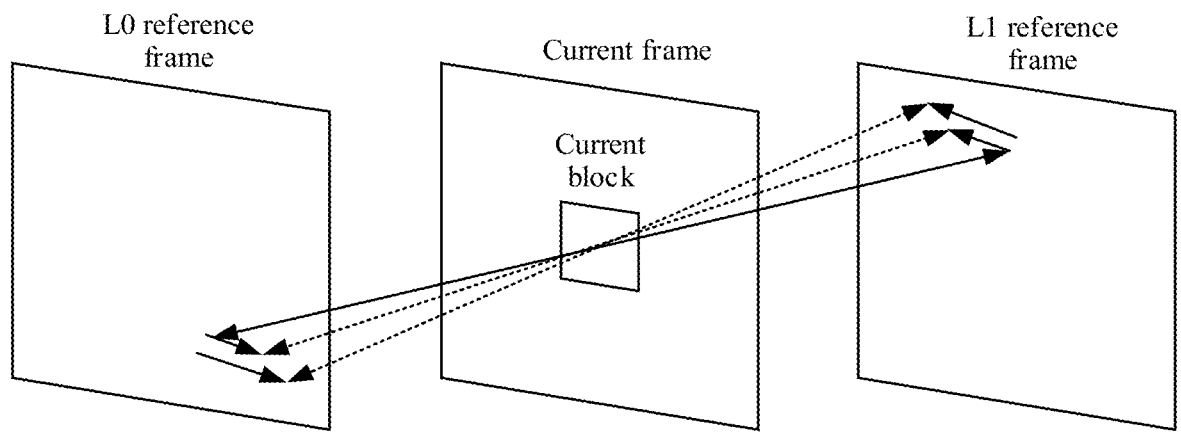
FIG. 9 is another schematic diagram of an MMVD search point according to an embodiment.

FIG. 8 is a schematic diagram of an MMVD search point according to an embodiment, and FIG. 9 is a schematic diagram of an MMVD search process according to this embodiment.

For example, the start point of the MV is a hollow dot at the center in FIG. 8, or a location corresponding to a solid line in FIG. 9.

Operation 2: Determine, based on a direction IDX, ab offset direction based on the start point of the MV.

Operation 3: Determine, based on a distance IDX, a quantity of pixel elements that are offset in the direction indicated by the direction IDX.

For example, direction IDX==00 and distance IDX=2 indicate that a motion vector that is offset by one pixel element in a positive X direction is used as a motion vector of the current picture block, to predict or obtain the predicted pixel value of the current picture block. Combined intra and inter mode:

In a coding block/CU encoded in a merge mode, an indicator (for example, ciip_flag) may be transmitted to indicate whether the combined intra and inter prediction (combined inter and intra prediction, CIIP) mode is used for the current picture block. When the CIP mode is used, an intra prediction block may be generated based on an intra prediction mode selected from an intra candidate mode list (intra candidate list) according to a related syntax element, and an inter prediction block is generated by using a conventional inter prediction method. Finally, an adaptive weighting manner is used to combine the intra coding prediction block and the inter coding prediction block to generate a final prediction block.

For a luminance block, the intra candidate mode list may be selected from four modes: a DC mode, a planar mode, a horizontal (horizontal) mode, and a vertical (vertical) mode. A size of the intra candidate mode list is selected based on a shape of a current coding block, and there may be three or four modes in the intra candidate mode list. When the width of a current coding block/CU is greater than twice the height, the intra candidate mode list does not include the horizontal mode. When the height of a current coding block/CU is greater than twice the width, the intra candidate mode list does not include the vertical mode.

In a weighting method that combines intra coding and inter coding, different weighting coefficients are used for different intra prediction modes. In an embodiment, when the DC or planar mode is used for intra coding, or when the length or width of the current coding block is less than or equal to 4, a same weight value/weight coefficient is used for a predictor obtained through intra prediction and a predictor obtained through inter prediction. Otherwise, a weight value/weight coefficient may be determined based on an intra prediction mode used by the current block and/or a location of a prediction sample in the current block. For example, a variable weight coefficient is used when the horizontal and vertical modes are used for intra coding.

Triangle Prediction Unit Mode:

The triangle prediction unit mode (triangle PU) may also be referred to as a triangle partition mode (TPM) or a merge triangle mode. For ease of description, in this application, the triangle prediction unit mode or the triangle partition mode is briefly referred to as the TPM, which is also applicable subsequently.

Figure 10:
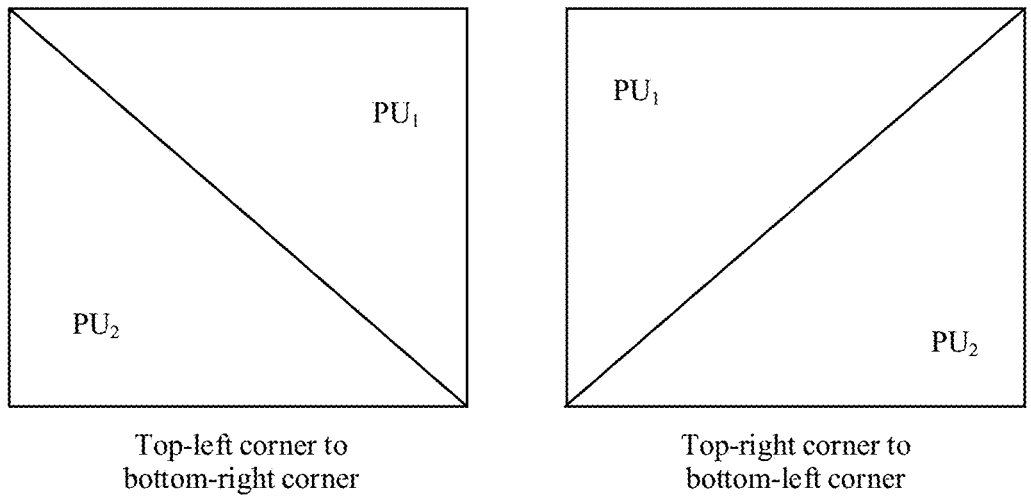
FIG. 10 is a schematic diagram of triangle partition.
Figure 11:
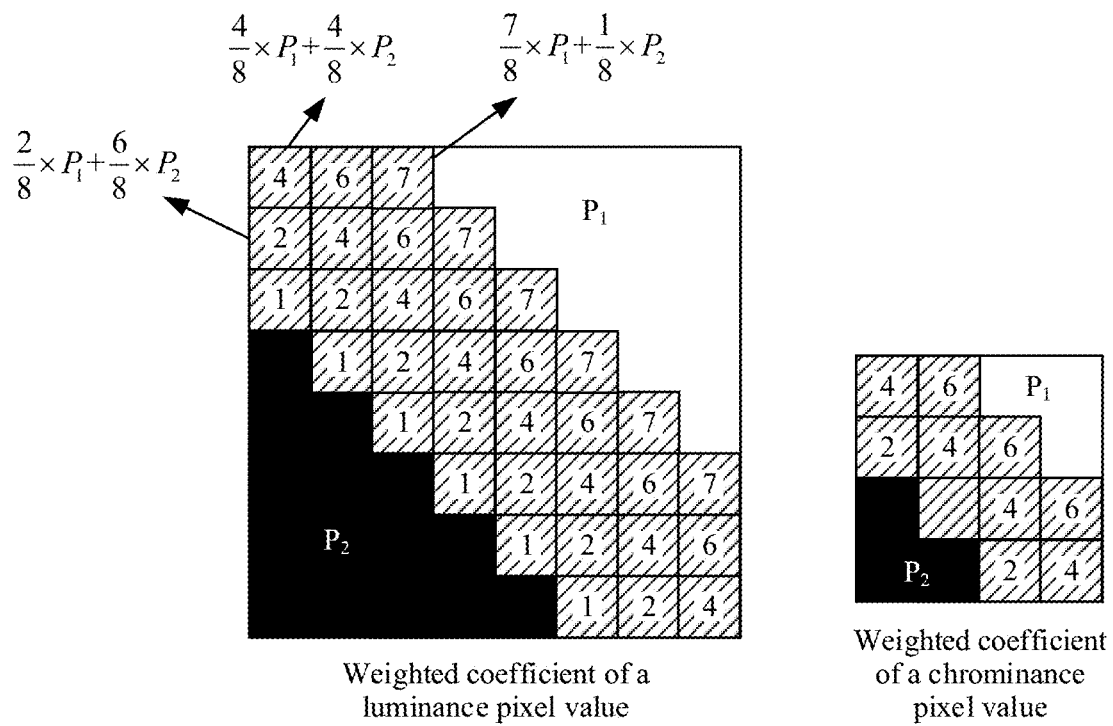
FIG. 11 is a schematic diagram of a prediction method in a triangle partition manner.

As shown in FIG. 11, a current picture block is split into two triangle prediction units, and a motion vector and a reference index are selected from a uni-prediction candidate list for each triangle prediction unit. Then, a predictor is obtained for each of the two triangle prediction units, and a predictor is obtained by performing adaptive weighting on a pixel included in each hypotenuse region. Then, transform and quantization processes are performed on the entire current picture block. It should be noted that a triangle prediction unit method is usually applied only in a skip mode or a merge mode. The left side of FIG. 10 shows a top-left to bottom-right split mode (in other words, splitting from top-left to bottom-right), and the right side of FIG. 10 shows a top-right to bottom-left split mode (in other words, splitting from top-right to bottom-left).

A uni-prediction candidate list in the triangle prediction unit mode may usually include five candidate predicted motion vectors. These candidates predicted motion vectors are obtained, for example, by using seven peripheral neighboring blocks (five spatial neighboring blocks and two temporal co-located blocks) in FIG. 5. Motion information of the seven neighboring blocks is searched for, and the seven neighboring blocks are placed into the uni-prediction candidate list in a sequence. For example, the sequence may be a bi-prediction motion vector in L0, a bi-prediction motion vector in L1, and an average of motion vectors in L0 and L1. If there are fewer than five candidates, a zero motion vector 0 is added to the uni-prediction candidate list. During encoding, the uni-prediction candidate list is obtained in the foregoing manner. For example, in the uni-prediction candidate list, forward prediction motion information is used to predict a pixel predictor of one triangle PU, and backward prediction motion information is used to predict a pixel predictor of the other triangle PU. An encoder side selects an optimal motion vector through traversal. For example, the following manner {m, i, j} may be used:

{0, 1, 0}, {1, 0, 1}, {1, 0, 2}, {0, 0, 1}, {0, 2, 0}
{1, 0, 3}, {1, 0, 4}, {1, 1, 0}, {0, 3, 0}, {0, 4, 0}
{0, 0, 2}, {0, 1, 2}, {1, 1, 2}, {0, 0, 4}, {0, 0, 3}
{0, 1, 3}, {0, 1, 4}, {1, 1, 4}, {1, 1, 3}, {1, 2, 1}
{1, 2, 0}, {0, 2, 1}, {0, 4, 3}, {1, 3, 0}, {1, 3, 2}
{1, 3, 4}, {1, 4, 0}, {1, 3, 1}, {1, 2, 3}, {1, 4, 1}
{0, 4, 1}, {0, 2, 3}, {1, 4, 2}, {0, 3, 2}, {1, 4, 3}
{0, 3, 1}, {0, 2, 4}, {1, 2, 4}, {0, 4, 2}, {0, 3, 4} where in {m, i, j}, m at the first location represents the top-left to bottom-right split mode or the top-right to bottom-left split mode, the second location represents forward motion information of an $i^{th}$ candidate predicted motion vector used for the first triangle PU, and the third location represents backward motion information of a $j^{th}$ candidate predicted motion vector used for the second triangle PU.

For an adaptive weighting process performed based on the predictor of the pixel included in the hypotenuse region, refer to FIG. 11. After prediction on triangle prediction units $P_1$ and $P_2$ is completed, the adaptive weighting process is performed on the pixel included in the hypotenuse region, to obtain a final predictor of the current picture block.

For example, in the picture on the left side in FIG. 11, a predictor of a pixel at a location 2 is $$\frac{2}{8} \times P_1 + \frac{6}{8} \times P_2.$$

$P_1$ represents a predictor of a pixel in a top-right region in FIG. 11, and $P_2$ represents a predictor of a pixel in a bottom-left region in FIG. 11.

Two sets of weighted parameters are as follows:

A first set of weighted parameters, {7/8, 6/8, 4/8, 2/8, 1/8} and {7/8, 4/8, 1/8}, are used for luma and chroma points, respectively.

A second set of weighted parameters, {7/8, 6/8, 5/8, 4/8, 3/8, 2/8, 1/8} and {6/8, 4/8, 2/8}, are used for luma and chroma points, respectively.

One set of weighted parameters are used to encode and decode the current picture block. When reference pictures of the two prediction units are different or a motion vector difference between the two prediction units is greater than 16 pixels, the second set of weighted parameters is selected; otherwise, the first set of weighted parameters is used.

Figure 12:
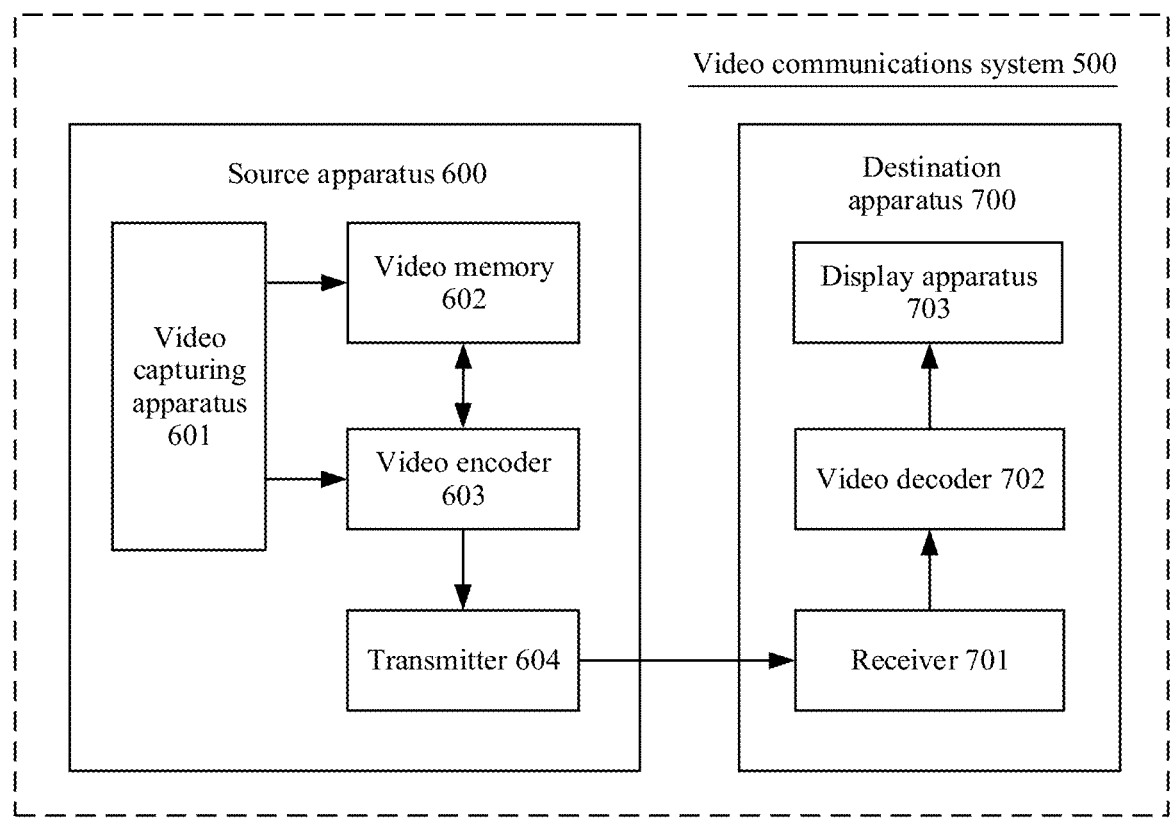
FIG. 12 is a schematic block diagram of a video communications system according to an embodiment.

FIG. 12 is a schematic block diagram of a video communications system according to an embodiment.

A video communications system 500 shown in FIG. 12 includes a source apparatus 600 and a destination apparatus 700. The source apparatus 600 can encode an obtained video, and transmit an encoded video bitstream to the receiving apparatus 700. The destination apparatus 700 can parse the received video bitstream to obtain a video picture, and display the video by using a display apparatus.

The picture prediction method in the embodiments of this application may be performed by the source apparatus 600 or the destination apparatus 700. The picture prediction method in the embodiments of this application may be performed by a video encoder 603 or a video decoder 702.

The video communications system 500 may also be referred to as a video coding system. The source apparatus 600 may also be referred to as a video encoding apparatus or a video encoding device. The destination apparatus 700 may also be referred to as a video decoding apparatus or a video decoding device.

In FIG. 12, the source apparatus 600 includes a video capturing apparatus 601, a video memory 602, a video encoder 603, and a transmitter 604. The video memory 602 may store a video obtained by the video capturing apparatus 601. The video encoder 603 may encode video data from the video memory 602 and the video capturing apparatus 601. In some examples, the source apparatus 600 directly transmits encoded video data to the destination apparatus 700 through the transmitter 604. The encoded video data may further be stored in a storage medium or a file server, so that the destination apparatus 700 extracts the encoded video data later for decoding and/or playing.

In FIG. 12, the destination apparatus 700 includes a receiver 701, a video decoder 702, and a display apparatus 703. In some examples, the receiver 701 may receive the encoded video data through a channel 800. A display apparatus 703 may be integrated with the destination apparatus 700 or may be outside the destination apparatus 7000. Usually, the display apparatus 700 displays decoded video data. The display apparatus 700 may include a plurality of types of display apparatuses such as a liquid crystal display, a plasma display, an organic light-emitting diode display, or another type of display apparatus.

Embodiments of the source apparatus 600 and the destination apparatus 700 may be any one of the following devices: a desktop computer, a mobile computing apparatus, a notebook (for example, laptop) computer, a tablet computer, a set top box, a smartphone, a handset, a television, a camera, a display apparatus, a digital media player, a video game console, a vehicle-mounted computer, or another similar device.

The destination apparatus 700 may receive the encoded video data from the source apparatus 600 through the channel 800. The channel 800 may include one or more media and/or apparatuses that can move the encoded video data from the source apparatus 600 to the destination apparatus 700. In an example, the channel 800 may include one or more communications media that can enable the source apparatus 600 to directly transmit the encoded video data to the destination apparatus 700 in real time. In this example, the source apparatus 600 may modulate the encoded video data according to a communications standard (for example, a wireless communications protocol) and may transmit the modulated video data to the destination apparatus 700. The one or more communications media may include wireless and/or wired communications media, for example, a radio frequency (radio frequency, RF) spectrum or one or more physical transmission lines. The one or more communications media may form a part of a packet-based network (for example, a local area network, a wide area network, or a global network (for example, the internet)). The one or more communications media may include a router, a switch, a base station, or another device implementing communication between the source apparatus 600 and the destination apparatus 700.

In another example, the channel 800 may include a storage medium that stores the encoded video data generated by the source apparatus 600. In this example, the destination apparatus 700 may access the storage medium through disk access or card access. The storage medium may include a plurality of locally accessible data storage media such as a Blu-ray, a high-density digital video disc (DVD), a compact disc read-only memory (CD-ROM), a flash memory, or another suitable digital storage medium configured to store the encoded video data.

In another example, the channel 800 may include a file server or another intermediate storage apparatus that stores the encoded video data generated by the source apparatus 600. In this example, the destination apparatus 700 may access, through streaming transmission or downloading, the encoded video data stored in the file server or the another intermediate storage apparatus. The file server may be of a server type that can store the encoded video data and transmit the encoded video data to the destination apparatus 700. For example, the file server may include a world wide web (world wide web, Web) server (for example, used for a website), a file transfer protocol (FTP) server, a network attached storage (network attached storage, NAS) apparatus, and a local disk drive.

The destination apparatus 700 may access the encoded video data through a standard data connection (for example, an internet connection). An example type of the data connection includes a wireless channel, a wired connection (for example, a cable modem), or a combination thereof that is suitable for accessing the encoded video data stored on the file server. Transmission of the encoded video data from the file server may be streaming transmission, download transmission, or a combination thereof.

The following describes in detail the picture prediction method in the embodiments of this application with reference to specific accompanying drawings.

Figure 13:
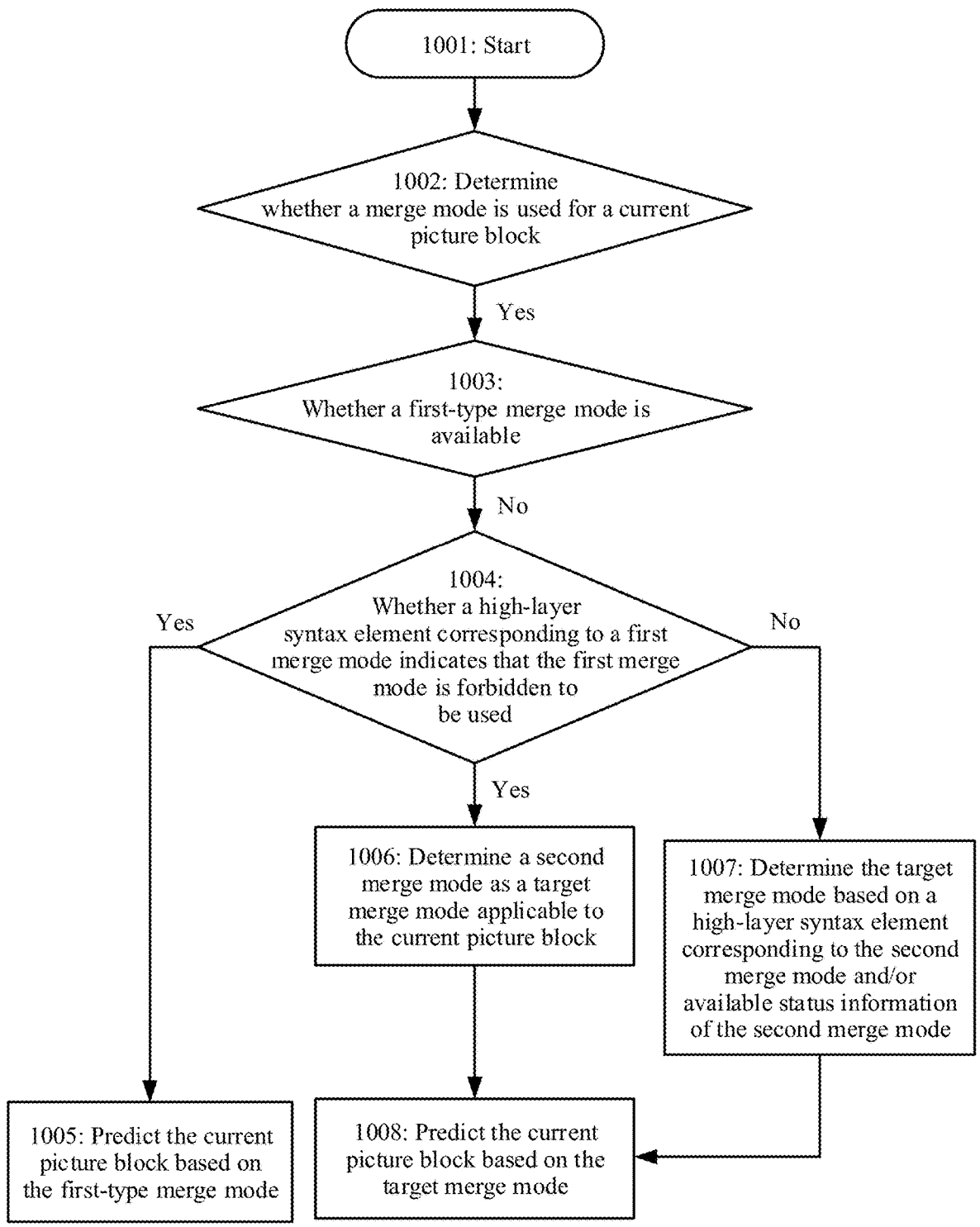
FIG. 13 is a schematic flowchart of a picture prediction method according to an embodiment.

FIG. 13 is a schematic flowchart of a picture prediction method according to an embodiment. The picture prediction method shown in FIG. 13 may be performed by a picture prediction apparatus (the picture prediction apparatus may be located in a picture encoding apparatus (system) or a picture decoding apparatus (system)). In an embodiment, the method shown in FIG. 13 may be performed by the picture encoding apparatus or the picture decoding apparatus. The method shown in FIG. 13 may be performed on an encoder side, or may be performed on a decoder side. The method shown in FIG. 13 includes operation 1001 to operation 1008. The following separately describes these operations in detail.

1001: Start.

Operation 1001 indicates that picture prediction starts.

1002: Determine whether a merge mode is used for a current picture block.

In an embodiment, the method shown in FIG. 13 further includes: obtaining the current picture block before operation 1002.

The current picture block may be a picture block in a current to-be-encoded or to-be-decoded picture.

It should be understood that, in this application, the current picture block may be obtained in a process of determining a target merge mode of the current picture block or after the target merge mode of the current picture block is determined.

For the decoder side, in operation 1002, whether the merge mode is used for the current picture block may be determined based on a CU-level syntax element merge_flag [x0][y0].

If merge_flag[x0][y0]=1, it is determined that the merge mode is used to predict the current picture block. If merge_flag[x0][y0]=1, it is determined that the merge mode is not used to predict the current picture block. x0 and y0 represent a coordinate location of a luminance pixel element at the top-left corner of the current picture block relative to a luminance pixel element at the top-left corner of the current picture.

After it is determined, based on the CU-level syntax element merge_flag[x0][y0], that the merge mode is used for the current picture block, the target merge mode that is finally used may be determined by parsing specific information in the CU-level syntax element merge_flag[x0][y0].

When it is determined in operation 1002 that the merge mode is not used for the current picture block, another mode other than the merge mode may be used to predict the current picture block. For example, when it is determined that the merge mode is not used for the current picture block, an AMVP mode may be used to predict the current picture block.

After it is determined in operation 1002 that the merge mode is used for the current picture block, operation 1003 continues to be performed, to determine the target merge mode applicable to the current picture block.

1003: Determine whether to use a level-1 merge mode.

In an embodiment, whether the level-1 merge mode is available may be determined based on a high-layer syntax element corresponding to the level-1 merge mode and/or available status information corresponding to the level-1 merge mode.

In an embodiment, it is assumed that the level-1 merge mode includes two merge modes in total: a merge mode A and a merge mode B. In this case, whether there is an available merge mode in the level-1 merge mode is determined one by one. If there is an available merge mode, operation 1005 is performed. If no merge mode is available in the level-1 merge mode, it is determined that the level-1 merge mode is unavailable. In this case, the target merge mode needs to be determined from a level-2 merge mode. In other words, operation 1004 is performed.

1004: Determine whether a high-layer syntax element corresponding to the first merge mode indicates that the first merge mode is forbidden to be used.

The first merge mode belongs to the level-2 merge mode, and the level-2 merge mode further includes a second merge mode.

When it is determined in operation 1004 that the high-layer syntax element corresponding to the first merge mode indicates that the first merge mode is forbidden to be used, operation 1006 is performed to determine the second merge mode as the target merge mode.

In an embodiment, when the high-layer syntax element of the first merge mode indicates that the first merge mode is forbidden to be used, there is no need to parse available status information of the remaining second merge mode, and the second merge mode may be directly determined as the final target merge mode. This can reduce, as much as possible, redundancy caused by determining the target merge mode in a picture prediction process.

When it is determined in operation 1004 that the high-layer syntax element corresponding to the first merge mode indicates that the first merge mode is allowed to be used, operation 1007 is performed to further determine the target merge mode.

1005: Predict the current picture block based on the level-1 merge mode.

It should be understood that, in operation 1005, if the merge mode A in the level-1 merge mode is available, the current picture block is predicted based on the merge mode A.

1006: Determine the second merge mode as the target merge mode applicable to the current picture block.

When the high-layer syntax element corresponding to the first merge mode indicates that the first merge mode is forbidden to be used, there is no need to parse a high-layer syntax element and/or the available status information corresponding to the second merge mode, and the second merge mode may be directly determined as the target merge mode.

1007: Determine the target merge mode based on the high-layer syntax element corresponding to the second merge mode and/or the available status information of the second merge mode.

The available status information of the second merge mode is used to indicate whether the second merge mode is used when the current picture block is predicted.

For example, the second merge mode is a CIIP mode, and the available status information of the second merge mode is a value of ciip_flag. When ciip_flag is 0, the CIIP mode is not used for the current picture block. When ciip_flag is 1, the CIIP mode is used to predict the current picture block.

It should be understood that, for the CIIP mode, if the CIIP mode is to be selected as the target merge mode, a high-layer syntax element corresponding to the CIIP needs to indicate that the CIIP mode is allowed to be used, and available status information that indicates an available status of the CIIP mode needs to indicate that the CIIP is available.

For example, when sps_ciip_enabled_flag=1 and ciip_flag=1, the CIIP mode may be determined as the target merge mode of the current picture block.

In operation 1007, because the first merge mode is allowed to be used, both the first merge mode and the second merge mode may be used as the target merge mode of the current picture block. Therefore, the target merge mode may be determined from the level-2 merge mode based on a high-layer syntax and available status information that are corresponding to one of the merge modes.

In an embodiment, the first merge mode is a TPM mode, and the second merge mode is the CIIP mode.

The following describes in detail how to determine the target merge mode when the first merge mode is the TPM mode and the second merge mode is the CIIP mode.

In an embodiment, when a high-layer syntax element corresponding to the TPM mode indicates that the TPM mode is forbidden to be used, the CIIP mode is determined as the target merge mode.

For example, when sps_triangle_enabled_flag corresponding to the TPM mode is 0, the TPM mode is forbidden to be used. In this case, there is no need to parse a specific value of ciip_flag. Instead, the CIIP mode may be directly determined as the target merge mode. In this way, an unnecessary parsing process can be reduced, and redundancy of the solution can be reduced.

In an embodiment, when the high-layer syntax element corresponding to the TPM mode indicates that the TPM mode is forbidden to be used, there is no need to determine, by parsing the high-layer syntax corresponding to the CIIP mode and/or the available status information that indicates the available status of the CIIP mode, whether the CIP mode is available. Instead, the CIIP mode may be directly determined as the target merge mode. This can reduce redundancy in the process of determining the target merge mode.

In an embodiment, when the high-layer syntax element corresponding to the TPM mode indicates that the TPM mode is allowed to be used, the target merge mode is determined based on the high-layer syntax element corresponding to the CIIP mode and/or the available status information that indicates the available status of the CIIP mode.

For example, when sps_triangle_enabled_flag corresponding to the TPM mode is 1, the TPM mode is allowed to be used. In this case, both the TPM mode and the CIIP mode may be used as the target merge mode. Therefore, it is necessary to further determine whether to select either the TPM mode or the CIIP mode as the target merge mode.

In an embodiment, when the high-layer syntax element corresponding to the CIIP mode and/or the available status information that indicates the available status of the CIIP mode indicate/indicates that the CIIP mode is forbidden to be used, the TPM mode is determined as the target merge mode.

That the high-layer syntax element corresponding to the CIP mode and/or the available status information that indicates the available status of the CIIP mode indicate/indicates that the CIIP mode is forbidden to be used includes cases 1 to 3:

Case 1: The high-layer syntax element corresponding to the CIIP mode indicates that the CIIP mode is forbidden to be used, and the available status information that indicates the available status of the CIIP mode indicates that the CIIP mode is unavailable.

Case 2: The high-layer syntax element corresponding to the CIIP mode indicates that the CIIP mode is allowed to be used, and the available status information that indicates the available status of the CIIP mode indicates that the CIIP mode is unavailable.

Case 3: The available status information that indicates the available status of the CIIP mode indicates that the CIIP mode is unavailable.

In an embodiment, when the high-layer syntax element corresponding to the CIIP mode indicates that the CIIP mode is allowed to be used, and the available status information that indicates the available status of the CIIP mode indicates that the CIIP mode is available, the CIIP mode is determined as the target merge mode.

1008: Predict the current picture block based on the target merge mode.

In the method shown in FIG. 13, before operation 1007 is performed, the method shown in FIG. 13 further includes: determining that a type of a slice or slice group in which the current picture block is located is B; and determining that a maximum quantity of candidate TPM modes supported by the slice or slice group in which the current picture block is located is greater than or equal to 2.

In an embodiment, before the target merge mode is determined based on the high-layer syntax element corresponding to the CIIP mode and/or the available status information that indicates the available status of the CIIP mode, the method further includes: determining that the type of the slice or slice group in which the current picture block is located is B; and determining that the maximum quantity of candidate TPM modes supported by the slice or slice group in which the current picture block is located is greater than or equal to 2.

In an embodiment, the method shown FIG. 13 further includes: when the level-1 merge mode is unavailable, and the high-layer syntax element corresponding to the TPM mode indicates that the TPM mode is allowed to be used, but the current picture block does not meet at least one of a condition A and a condition B, the CIIP mode is determined as the target merge mode.

The condition A and the condition B are as follows:
Condition A: The type of the slice in which the current picture block is located is B.
Condition B: The maximum quantity of candidate TPM modes supported by the slice or slice group in which the current picture block is located is greater than or equal to 2.

The condition A and the condition B may be represented in some specific manners. For example, the condition A may be represented by slice_type==B, and the condition B may be represented by MaxNumTriangleMergeCand ≥2. MaxNumTriangleMergeCand indicates the maximum quantity of candidate TPM modes supported by the slice or slice group in which the current picture block is located.

The TPM mode can be selected as the target merge mode finally used to predict the current picture block only when both the condition A and the condition B are met.

If either the condition A or the condition B is not met, the CIIP mode is determined as the target merge mode.

When the high-layer syntax element corresponding to the TPM mode indicates that the TPM mode is forbidden to be used, if either the condition A or the condition B is not met, the CIIP mode is determined as the target merge mode.

When the high-layer syntax element corresponding to the TPM mode indicates that the TPM mode is allowed to be used, if either the condition A or the condition B is not met, the CIIP mode is determined as the target merge mode.

In other words, the CIIP mode may be determined as the target merge mode provided that one of sps_trangle_enabled_flag=1, the condition A, and the condition B is not met.

Conversely, if sps_trangle_enabled_flag=1, the condition A, and the condition B are all met, the target merge mode needs to be determined based on ciip_flag according to several conditions in the prior art.

In an embodiment, the high-layer syntax element is a syntax element at at least one of a sequence level, a picture level, a slice level, and a slice group level.

In an embodiment, the level-1 merge mode includes a regular merge mode, an MMVD mode, and a subblock merge mode.

When it is determined whether the level-1 merge mode is available, whether these modes are available may be sequentially determined in a sequence of the regular merge mode, the MMVD mode, and the subblock merge mode.

For example, whether the regular merge mode is available may first be determined. When the regular merge mode is unavailable (if the regular merge mode is available, the regular merge mode may be directly used as the final target merge mode), whether the MMVD mode is available continues to be determined. When the MMVD mode is unavailable, whether the subblock merge mode is available continues to be determined.

In an embodiment, the method shown in FIG. 13 may be applied to the encoder side, to encode the current picture block.

In an embodiment, the method shown in FIG. 13 may be applied to the decoder side, to decode the current picture block.

To better understand a specific process of the picture prediction method in the embodiments of this application, the following describes in detail, with reference to a specific example, a process of determining a picture merge mode in the picture prediction method in the embodiments of this application.

Figure 14:
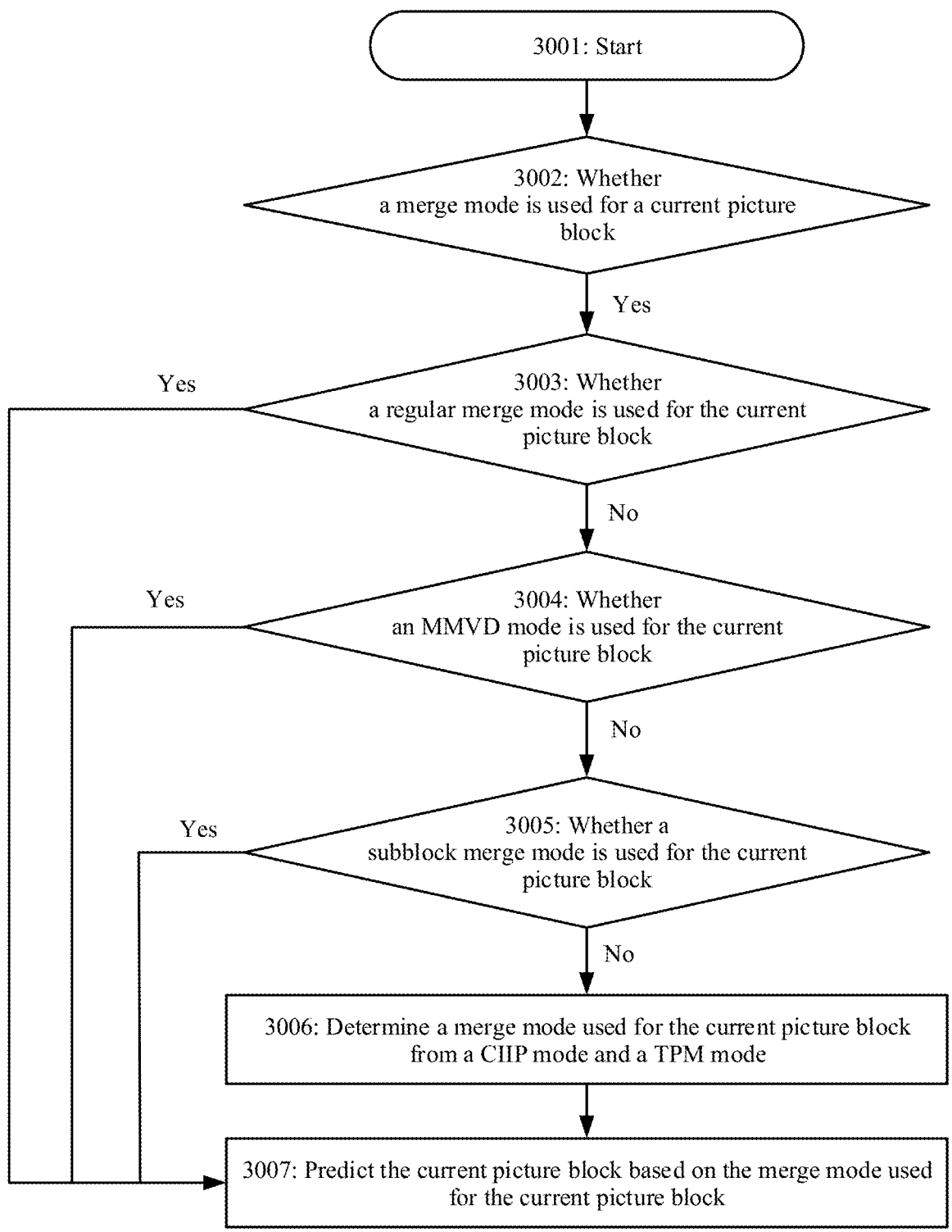
FIG. 14 is a schematic flowchart of a picture prediction method according to an embodiment.

The following describes in detail the picture prediction method in the embodiments of this application with reference to FIG. 14 and Table 4.

FIG. 14 shows a process of determining a merge mode according to an embodiment. The process shown in FIG. 14 includes operation 3001 to operation 3007. The following describes these operations in detail.

3001: Start.

Operation 3001 indicates that picture prediction starts.

3002: Determine whether a merge mode is used for a current picture block.

In an embodiment, when operation 3002 is performed by a decoder side, in operation 3002, whether the merge mode is used for the current picture block may be determined based on a value of a CU-level syntax element merge_flag [x0] [y0] corresponding to the current picture block.

For example, as shown in Table 4, when merge_flag[x0][y0]=0, the merge mode is not used for the current picture block. In this case, the current picture block may be predicted in another manner. For example, the current picture block may be predicted in an AMVP mode.

When merge_flag[x0][y0]=1, the merge mode is used for the current picture block. Next, it may further be determined which merge mode is used to predict the current picture block.

It should be understood that, when there is no merge_flag [x0][y0] in a bitstream, merge_flag[x0][y0] is 0 by default.

(x0, y0) represents a coordinate location of a luminance pixel element at the top-left corner of the current picture block relative to a luminance pixel element at the top-left corner of a current picture. A meaning of (x0, y0) in the following syntax elements is the same as this, and details are not described herein.

In an embodiment, the method shown in FIG. 14 further includes: obtaining the current picture block before operation 3002.

The current picture block may be a picture block in a current to-be-encoded or to-be-decoded picture.

It should be understood that, in this application, the current picture block may be obtained in a process of determining a target merge mode of the current picture block or after the target merge mode of the current picture block is determined.

3003: Determine whether a regular merge mode is used for the current picture block.

In an embodiment, in operation 3003, whether the regular merge mode is used for the current picture block may be determined by parsing a value of a syntax element regular_merge_flag[x0][y0].

When regular_merge_flag[x0][y0]=1, it is determined that the regular merge mode is used for the current picture block. In this case, operation 3007 may be performed. To be specific, the current picture block is predicted based on the regular merge mode.

When regular_merge_flag[x0][y0]=0, it is determined that the regular merge mode is not used for the current picture block. In this case, it is necessary to continue to perform operation 3004, to further determine the merge mode used for the current picture block.

It should be understood that, when there is no regular_merge_flag[x0][y0] in the bitstream, regular_merge_flag [x0][y0] is 0 by default.

3004: Determine whether an MMVD mode is used for the current picture block.

In an embodiment, in operation 3004, when a high-layer syntax element corresponding to the MMVD mode indicates that the MMVD may be allowed to be used, and an area of the current picture block is not equal to 32, whether the MMVD is used for the current picture block may be determined by parsing a value of a syntax element mmvd_flag [x0][y0].

When mmvd_flag[x0][y0]=1, it is determined that the MMVD mode is used for the current picture block. In this case, operation 3007 may be performed. To be specific, the current picture block is predicted based on the MMVD mode.

When mmvd_flag[x0][y0]=0, it is determined that the MMVD mode is not used for the current picture block. In this case, it is necessary to continue to perform operation 3005, to further determine the merge mode used for the current picture block.

It should be understood that, when there is no mmvd_flag [x0][y0] in the bitstream, mmvd_flag[x0][y0] is 0 by default.

3005: Determine whether a subblock merge mode is used for the current picture block.

In operation 3004, whether the subblock merge mode is used for the current picture block may be determined based on a value, of a syntax element merge_subblock_flag[x0] [y0], that is obtained by parsing the bitstream.

When merge_subblock_flag[x0][y0]=1, it is determined that the subblock merge mode is used for the current picture block. In this case, operation 3007 may be performed. To be specific, the current picture block is predicted based on the subblock merge mode.

When merge_subblock_flag[x0][y0]=0, it is determined that the subblock merge mode is not used for the current picture block. In this case, it is necessary to continue to perform operation 3006, to further determine the merge mode used for the current picture block.

It should be understood that, when there is no merge_subblock_flag[x0][y0] in the bitstream, merge_subblock_flag[x0][y0] is 0 by default.

Further, in operation 3004, the value of the syntax element merge_subblock_flag[x0][y0] may be parsed only when a maximum length of a subblock merge candidate list is greater than 0 and both the width and the height of the current picture block are greater than or equal to 8, and operation 3007 continues to be performed when an obtained value of merge_subblock_flag[x0][y0] is 0.

3006: Determine the merge mode used for the current picture block from a CIIP mode and a TPM mode.

In an embodiment, in operation 3006, if all the six conditions in the following conditions (1) to (6) are met, ciip_flag[x0][y0] is parsed from the bitstream, the merge mode used for the current picture block is determined based on a value of ciip_flag[x0][y0]. When ciip_flag[x0][y0]=1, the CIIP mode is used to predict the current picture block.

In addition, when the following condition (1) is met, if any one of the following conditions (2) to (6) is not met, the CIIP mode is used to predict the current picture block.

(1) sps_ciip_enabled_flag=1;

(2) sps_triangle_enabled_flag=1;
(3) cu_skip_flag[x0][y0]==0;
(4) (cbWidth*cbHeight)≥64;
(5) cbWidth<128; and
(6) cbHeight<128.

cbWidth and cbHeight are respectively the width and the height of the current picture block.

In an embodiment, more determining conditions may further be added when the merge mode used for the current block is determined in operation 3006.

Based on the foregoing conditions (1) to (6), conditions (7) and (8) may further be added:
(7) slice_type==B; and
(8) MaxNumTriangleMergeCand >2.

In an embodiment, in operation 3006, if all the eight conditions in the foregoing conditions (1) to (8) are met, ciip_flag[x0][y0] is parsed from the bitstream, the merge mode used for the current picture block is determined based on the value of ciip_flag[x0][y0]. When ciip_flag[x0][y0]=1, the CIIP mode is used to predict the current picture block.

In addition, when the foregoing condition (1) is met, if any one of the following conditions (2) to (8) is not met, the CIIP mode is used to predict the current picture block.

3007: Predict the current picture block based on the merge mode used for the current picture block.

When it is determined in operation 3003 that the regular merge mode is used for the current picture block, in operation 3007, the current picture block is predicted based on the regular merge mode. When it is determined in operation 3004 that the MMVD mode is used for the current picture block, in operation 3007, the current picture block is predicted based on the MMVD mode. When it is determined in operation 3005 that the subblock merge mode is used for the current picture block, in operation 3007, the current picture block is predicted based on the subblock merge mode.

Table 4 shows how to determine, based on a corresponding syntax element, a merge mode used for the current picture block when merge mode is used. The following describes in detail determining of the merge mode of the current picture block with reference to Table 4.

TABLE 4

```
merge_data( x0, y0, cbWidth, cbHeight )
{if ( CuPredMode[ x0 ][ y0 ] = = MODE_IBC )
  {if( MaxNumMergeCand > 1 )
    merge_idx[ x0 ][ y0 ]
  } else
  {...
  } else
    {...
    } else
      {if( MaxNumSubblockMergeCand > 0 && cbWidth >=
        8 && cbHeight >= 8 )
        merge_subblock_flag[ x0 ][ y0 ]
        if( merge_subblock_flag[ x0 ][ y0 ] = = 1 )
          {if( MaxNumSubblockMergeCand > 1 )
          merge_subblock_idx[ x0 ][ y0 ]
          } else
          { if(sps_ciip_enabled_flag &&
          sps_triangle_enabled_flag &&
            cu_skip_flag[ x0 ][ y0 ] = = 0 && ( cbWidth *
            cbHeight ) ≥
            64 && cbWidth < 128 && cbHeight < 128 )
            { ciip_flag[ x0 ][ y0 ]
              if( ciip_flag[ x0 ][ y0 ] &&
              MaxNumMergeCand > 1 )
              merge_idx[ x0 ][ y0 ]
```

TABLE 4-continued

```
            }
            if( MergeTriangleFlag[ x0 ][ y0 ] )
            {merge_triangle_split_dir[ x0 ][ y0 ]
            merge_triangle_idx0[ x0 ][ y0 ]
            merge_triangle_idx1[ x0 ][ y0 ]
            }
          }
        }
      }
}
```

When regular_merge_flag[x0][y0] shown in Table 4 is 1, it is determined that the regular merge mode is used for the current picture block. In this case, a parameter of the regular merge mode may be obtained by parsing a syntax element merge_idx[x0][y0]. When regular_merge_flag[x0][y0] shown in Table 4 is 0, it is determined that the regular merge mode is not used for the current picture block, and the merge mode used for the current picture block further needs to be determined.

When sps_mmvd_enabled_flag and cbWidth*cbHeight shown in Table 4 are respectively 1 and 32, it indicates that the MMNVD mode may be used for the current picture block. In this case, the merge mode of the current picture block may be determined based on the value of mmvd_flag[x0][y0]. If mmvd_flag[x0][y0]=1, it is determined that the MMVD mode is used for the current picture block, and a parameter of the MMVD mode may be determined by parsing syntax elements mmvd_merge_flag[x0][y0], mmvd_distance_idx[x0][y0], and mmvd_direction_idx[x0][y0]. If mmvd_flag[x0][y0]=0, the merge mode used for the current picture block further needs to be determined.

When merge_subblock_flag[x0][y0] shown in Table 4 is 1, it is determined that the subblock merge mode is used for the current picture block. When merge_subblock_flag[x0][y0] shown in Table 4 is 0, it is determined that the subblock merge mode is not used for the current picture block, and the merge mode used for the current picture block further needs to be determined.

When sps_ciip_enabled_flag shown in Table 4 is 0, it may be directly determined that the TPM mode is used for the current picture block. However, when sps_ciip_enabled_flag and sps_ciip_enabled_flag shown in Table 4 are respectively 1 and 0, it may be directly determined that the CIIP mode is used for the current picture block.

As shown in Table 4, when all the six conditions in the following conditions (1) to (6) are met, an available status information indication of the Ciip mode, namely, the value of ciip_flag[x0][y0], needs to be obtained from the bitstream. If ciip_flag[x0][y0]=1, itis determined that the CIIP mode is used for the current picture block. If ciip_flag[x0][y0]=0, it is determined that the TPM mode is used for the current picture block.

(1) sps_ciip_enabled_flag=1;
(2) sps_triangle_enabled_flag=1;
(3) cu_skip_flag[x0][y0]==0;
(4) (cbWidth*cbHeight)≥64;
(5) cbWidth<128;
(6) cbHeight<128.

In an embodiment, if (sps_ciip_enabled_flag && sps_triangle_enabled_flag &&cu_skip_flag[x0][y0]==0 && (cbWidth*cbHeight)≥64&&cbWidth<128 && cbHeight<128) in Table 4 may alternatively be replaced with if (sps_triangle_enabled_flag && sps_ciip_enabled_flag && cu_skip_flag[x0][y0]==0 && (cbWidth*cbHeight)≥64 && cbWidth<128 && cbHeight<128). In other words, a sequence of sps_ciip_enabled_flag and sps_triangle_enabled_flag may be adjusted. A specific result may be shown in Table 5.

TABLE 5

```
merge_data( x0, y0, cbWidth, cbHeight )
{if ( CuPredMode[ x0 ][ y0 ] = = MODE_IBC )
    {if( MaxNumMergeCand > 1 )
        merge_idx[ x0 ][ y0 ]
    } else
    {...
    } else
        {...
        } else
            {if( MaxNumSubblockMergeCand > 0 && cbWidth >=
    8 && cbHeight >= 8 )
                merge_subblock_flag[ x0 ][ y0 ]
                if( merge_subblock_flag[ x0 ][ y0 ] = = 1 )
                    {if( MaxNumSubblockMergeCand > 1 )
                        merge_subblock_idx[ x0 ][ y0 ]
                    } else
                    { if(sps_triangle_enabled_flag &&
                        sps_ciip_enabled_flag &&
                            cu_skip_flag[ x0 ][ y0 ] = = 0 &&
                            ( cbWidth * cbHeight ) ≥
                        64 && cbWidth < 128 && cbHeight < 128 )
                        { ciip_flag[ x0 ][ y0 ]
                            if( ciip_flag[ x0 ][ y0 ] &&
                            MaxNumMergeCand > 1 )
                                merge_idx[ x0 ][ y0 ]
                        }
                        if( MergeTriangleFlag[ x0 ][ y0 ] )
                        {merge_triangle_split_dir[ x0 ][ y0 ]
                            merge_triangle_idx0[ x0 ][ y0 ]
                            merge_triangle_idx1[ x0 ][ y0 ]
                        }
                    }
                }
            }
}
```

It should be noted that, in Table 4 and Table 5, a time sequence of determining the CIIP is earlier than a time sequence of determining the TPM. To be specific, the CTP is first determined, and a prediction mode finally used for the current block is determined based on a status of the CITP. If the CITP is true, there is no need to further determine information about the TPM. If the CIIP is false, it means that only the TPM is available. In this case, the final prediction mode of the current block may be set to the TPM mode. Priority setting or a logic of the determining time sequence is merely an example, and may alternatively be adjusted as required. For example, the time sequence of the TPM is made to be earlier than the time sequence of the CIIP. In this case, a condition for determining whether the TPM mode is applicable also needs to be adjusted as required.

TABLE 6

```
merge_data( x0, y0, cbWidth, cbHeight )
{if ( CuPredMode[ x0 ][ y0 ] = = MODE_IBC )
    {if( MaxNumMergeCand > 1 )
        merge_idx[ x0 ][ y0 ]
    } else
    {...
    } else
        {...
        } else
            {if( MaxNumSubblockMergeCand > 0 && cbWidth >=
    8 && cbHeight >= 8 )
                merge_subblock_flag[ x0 ][ y0 ]
                if( merge_subblock_flag[ x0 ][ y0 ] = = 1 )
                    {if( MaxNumSubblockMergeCand > 1 )
                        merge_subblock_idx[ x0 ][ y0 ]
                    } else
                    { if(sps_ciip_enabled_flag &&
```

TABLE 6-continued

```
                        sps_triangle_enabled_flag &&
                            slice_type == B &&
                            MaxNumTriangleMergeCand ≥ 2 &&
                            cu_skip_flag[ x0 ][ y0 ] = = 0 &&
                            ( cbWidth * cbHeight ) ≥
                        64 && cbWidth < 128 && cbHeight < 128)
                        { ciip_flag[ x0 ][ y0 ]
                            if( ciip_flag[ x0 ][ y0 ] &&
                            MaxNumMergeCand > 1 )
                                merge_idx[ x0 ][ y0 ]
                        }
                        if( MergeTriangleFlag[ x0 ][ y0 ] )
                        {merge_triangle_split_dir[ x0 ][ y0 ]
                            merge_triangle_idx0[ x0 ][ y0 ]
                            merge_triangle_idx1[ x0 ][ y0 ]
                        }
                    }
                }
            }
}
```

As shown in Table 6, when all the eight conditions in the following conditions (1) to (8) are met, the available status information indication of the CIIP mode, namely, the value of crp_flag[x0][y0], needs to be obtained from the bitstream. If ciip_flag[x0][y0]=1, it is determined that the CIP mode is used for the current picture block. If ciip_flag[x0][y0]=0, it is determined that the TPM mode is used for the current picture block.

(1) sps_ciip_enabled_flag=1;
(2) sps_triangle_enabled_flag=1;
(3) cu_skip_flag[x0][y0] _=0;
(4) (cbWidth*cbHeight) e 64;
(5) cbWidth<128;
(6) cbHeight<128.

In an embodiment, if(sps_ciip_enabled_flag && sps_triangle_enabled_flag &&slice_type==B && MaxNumTriangleMergeCand >2 && cu_skip_flag[x0][y0] _=0& (cbWidth*cbHeight)≥64&&cbWidth<128 && cbHeight<128) in Table 6 may alternatively be replaced with if(sps_triangle_enabled_flag && sps_ciip_enabled_flag &&slice_type==B && MaxNumTriangleMergeCand >2 && cu_skip_flag[x0][y0] _=0&& (cbWidth*cbHeight) ≥64&&cbWidth<128 && cbHeight<128). In other words, the sequence of sps_ciip_enabled_flag and sps_triangle_enabled_flag may be adjusted. A specific result may be shown in Table 7.

TABLE 7

```
merge_data( x0, y0, cbWidth, cbHeight )
{if ( CuPredMode[ x0 ][ y0 ] = = MODE_IBC )
    {if( MaxNumMergeCand > 1 )
        merge_idx[ x0 ][ y0 ]
    } else
    {...
    } else
        {...
        } else
            {if( MaxNumSubblockMergeCand > 0 && cbWidth >=
    8 && cbHeight >= 8 )
                merge_subblock_flag[ x0 ][ y0 ]
                if( merge_subblock_flag[ x0 ][ y0 ] = = 1 )
                    {if( MaxNumSubblockMergeCand > 1 )
                        merge_subblock_idx[ x0 ][ y0 ]
                    } else
                        if(sps_triangle_enabled_flag &&
                        sps_ciip_enabled_flag &&
                            slice_type == B &&
                            MaxNumTriangleMergeCand ≥ 2 &&
                            cu_skip_flag[ x0 ][ y0 ] = = 0 &&
                            ( cbWidth * cbHeight ) ≥
                        64 && cbWidth < 128 && cbHeight < 128)
```

TABLE 7-continued

```
{ ciip_flag[ x0 ][ y0 ]
    if( ciip_flag[ x0 ][ y0 ] &&
    MaxNumMergeCand > 1 )
        merge_idx[ x0 ][ y0 ]
    }
    if( MergeTriangleFlag[ x0 ][ y0 ] )
    {merge_triangle_split_dir[ x0 ][ y0 ]
    merge_triangle_idx0[ x0 ][ y0 ]
    merge_triangle_idx1[ x0 ][ y0 ]
    }
    }
    }
}
```

The foregoing describes in detail the picture prediction method in the embodiments of this application with reference to FIG. 13 and FIG. 14. The following describes the picture prediction method in the embodiments of this application with reference to FIG. 15.

Figure 15:
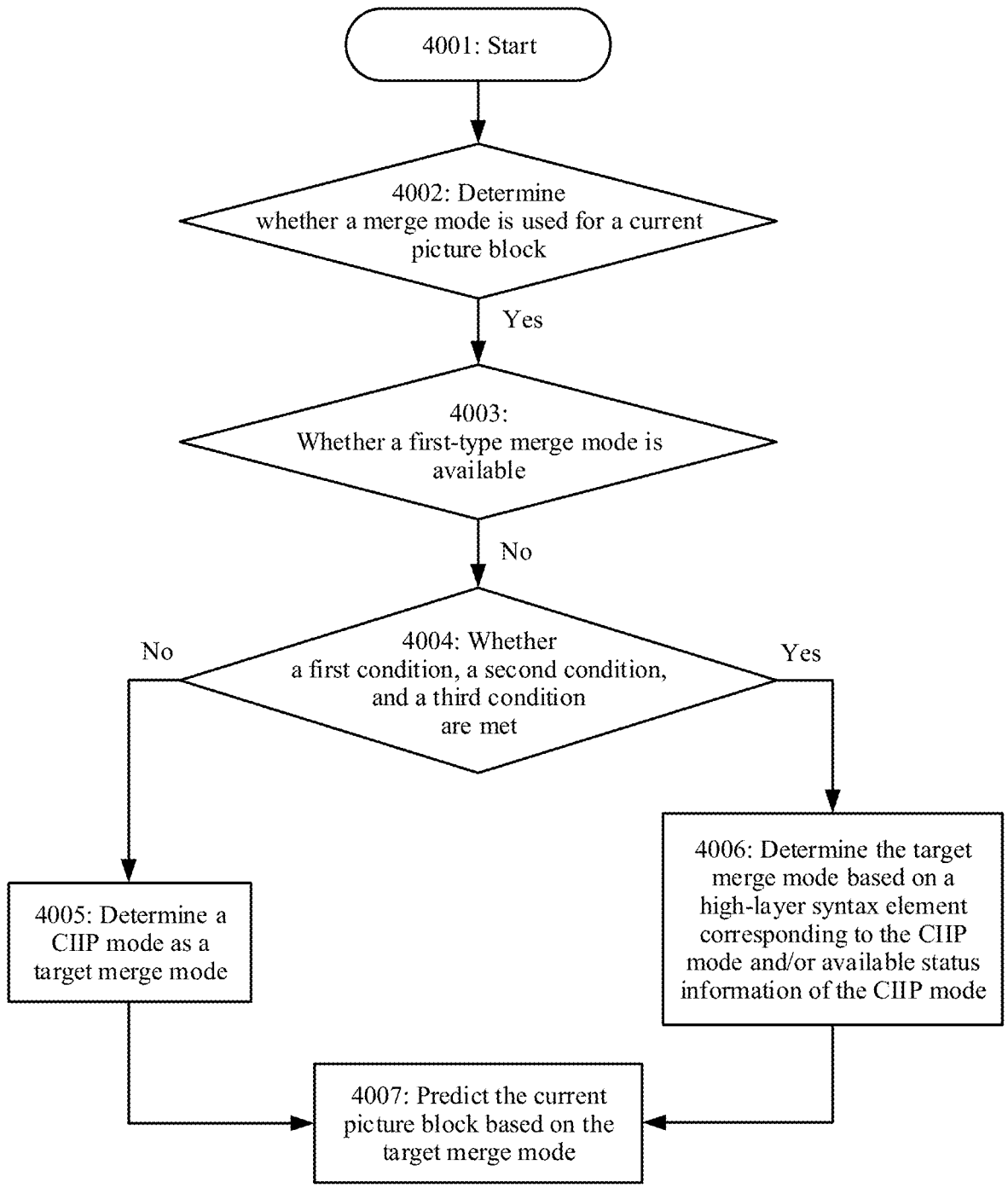
FIG. 15 is a schematic flowchart of a picture prediction method according to an embodiment.

FIG. 15 is a schematic flowchart of a picture prediction method according to an embodiment. The picture prediction method shown in FIG. 15 may be performed by a picture prediction apparatus (the picture prediction apparatus may be located in a picture decoding apparatus (system) or a picture encoding apparatus (system)). In an embodiment, the method shown in FIG. 15 may be performed by the picture encoding apparatus or the picture decoding apparatus. The method shown in FIG. 15 may be performed on an encoder side, or may be performed on a decoder side. The method shown in FIG. 15 includes operation 4001 to operation 4007. The following separately describes these operations in detail.

4001: Start.

Operation 4001 indicates that picture prediction starts.

4002: Determine whether a merge mode is used for a current picture block.

For the decoder side, in operation 4002, whether the merge mode is used for the current picture block may be determined based on a CU-level syntax element merge_flag [x0][y0]. For a specific determining process, refer to related descriptions below operation 1003.

When it is determined in operation 4002 that the merge mode is not used for the current picture block, another mode other than the merge mode may be used to predict the current picture block. For example, when it is determined that the merge mode is not used for the current picture block, an AMVP mode may be used to predict the current picture block.

After it is determined in operation 4002 that the merge mode is used for the current picture block, operation 4003 continues to be performed, to determine a target merge mode applicable to the current picture block.

In an embodiment, the method shown in FIG. 15 further includes: obtaining the current picture block before operation 4002.

The current picture block may be a picture block in a current to-be-encoded or to-be-decoded picture.

It should be understood that, in this application, the current picture block may be obtained in a process of determining the target merge mode of the current picture block or after the target merge mode of the current picture block is determined.

4003: Determine whether to use a level-1 merge mode.

In an embodiment, whether the level-1 merge mode is available may be determined based on a high-layer syntax element corresponding to the level-1 merge mode and/or available status information corresponding to the level-1 merge mode.

In an embodiment, the level-1 merge mode in operation 4003 includes a regular merge mode, an MMVD mode, and a subblock merge mode.

When it is determined whether the level-1 merge mode is available, whether these modes are available may be sequentially determined in a sequence of the regular merge mode, the MMVD mode, and the subblock merge mode. When all the modes are unavailable, it is determined that the level-1 merge mode is unavailable.

When it is determined in operation 4003 that the level-1 merge mode is unavailable, operation 4004 may continue to be performed to determine the target merge mode from a level-2 merge mode.

For the picture prediction method shown in FIG. 15, the level-1 merge mode and the level-2 merge mode may include all optional merge modes of the current picture block, and for the current picture block, a final target merge mode needs to be determined from the level-1 merge mode and the level-2 merge mode.

In an embodiment, a priority of the level-1 merge mode is higher than a priority of the level-2 merge mode.

That a priority of the level-1 merge mode is higher than a priority of the level-2 merge mode means that in a process of determining the target merge mode of the current picture block, the target merge mode is preferentially determined from the level-1 merge mode. If there is no available merge mode in the level-1 merge mode, the target merge mode is then determined from the level-2 merge mode.

4004: Determine whether a condition 1 to a condition 5 are met.

The condition 1 to the condition 5 are as follows:

Condition 1: A TPM mode is allowed to be used.

Condition 2: A type of a slice or slice group in which the current picture block is located is B.

Condition 3: A maximum quantity of candidate TPM modes supported by the slice or slice group in which the current picture block is located is determined to be greater than or equal to 2.

Condition 4: A size of the current picture block meets a preset condition.

Condition 5: A skip mode is not used to predict the current picture block.

The condition 1 may be represented by sps_triangle_enabled_flag=1, the condition 2 may be represented by slice_type==B, and the condition 3 may be represented by MaxNumTriangleMergeCand >2. MaxNumTriangleMergeCand indicates the maximum quantity of candidate TPM modes supported by the slice or slice group in which the current picture block is located.

When it is determined in operation 4004 that any one of the condition 1 to the condition 5 is not met, a CIIP mode may be directly determined as the target merge mode. In other words, operation 4005 is performed. When it is determined in operation 4004 that the five conditions, namely, the condition 1 to the condition 5, are met, the target merge mode further needs to be determined based on related information of the CIIP mode. In other words, operation 4006 is performed.

4005: Determine the CIIP mode as the target merge mode when the CIIP mode is allowed to be used.

In other words, in operation 4005, when the CIIP mode is allowed to be used, and any one of the condition 1 to the condition 5 is not met, the CIIP mode is determined as the target merge mode.

In an embodiment, when any one of the condition 1 to the condition 5 is not met, a value of available status information that indicates an available status of the CIIP mode is set to a first value. When the value of the available status information that indicates the available status of the CIIP mode is the first value, the CIIP mode is used to perform picture prediction on the current picture block.

It should be understood that a value of available status information that indicates an available status of the CIIP mode is set to a first value herein is equivalent to that the CIIP is determined as the target merge mode.

In an embodiment, the available status information that indicates the available status of the CIIP mode is ciip_flag.

That a value of available status information that indicates an available status of the CIIP mode is set to a first value may be that ciip_flag is set to 1.

In addition, when the value of the available status information that indicates the available status of the CIIP mode is set to a second value, it may mean that the CIIP mode is not used to perform picture prediction on the current picture block. For example, when the available status information that indicates the available status of the CIIP mode is ciip_flag, and ciip_flag=0, the CIIP mode is not used to perform picture prediction on the current picture block.

4006: Determine the target merge mode based on a high-layer syntax element corresponding to the CIIP mode and/or the available status information that indicates the available status of the CIIP mode.

The available status information that indicates the available status of the CIIP mode is used to indicate whether the CIIP mode is used when the current picture block is predicted.

In other words, in operation 4006, when all the conditions from the condition 1 to the condition 5 are met, the target merge mode further needs to be determined based on the high-layer syntax element corresponding to the CIIP mode and/or the available status information that indicates the available status of the CIIP mode.

The available status information that indicates the available status of the CIIP mode may be a value of ciip_flag. When ciip_flag is 0, the CIIP mode is unavailable for the current picture block. When ciip_flag is 1, the CIIP mode is available for the current picture block.

In an embodiment, that the target merge mode is determined based on the high-layer syntax element corresponding to the CIIP mode and/or the available status information that indicates the available status of the CIIP mode includes: when the high-layer syntax element corresponding to the CIIP mode and/or the available status information that indicates the available status of the CIIP mode indicate/indicates that the CIIP mode is forbidden to be used, the TPM mode is determined as the target merge mode.

That the high-layer syntax element corresponding to the CIP mode and/or the available status information that indicates the available status of the CIIP mode indicate/indicates that the CIIP mode is forbidden to be used includes cases 1 and 3:

Case 1: The high-layer syntax element corresponding to the CIIP mode indicates that the CIIP mode is forbidden to be used, and the available status information that indicates the available status of the CIIP mode indicates that the CIIP mode is unavailable.

Case 2: The high-layer syntax element corresponding to the CIIP mode indicates that the CIIP mode is allowed to be used, and the available status information that indicates the available status of the CIIP mode indicates that the CIIP mode is unavailable.

Case 3: The available status information that indicates the available status of the CIIP mode indicates that the CIIP mode is unavailable.

It should be understood that, when the high-layer syntax element corresponding to the CIIP mode indicates that the CIIP mode is allowed to be used, and the available status information that indicates the available status of the CIIP mode indicates that the CIIP mode is available, the CIIP mode is determined as the target merge mode.

In an embodiment, when the high-layer syntax element corresponding to the CIIP mode and/or the available status information that indicates the available status of the CIIP mode indicate/indicates that the CIIP mode is forbidden to be used, that the TPM mode is determined as the target merge mode includes:

When the high-layer syntax element corresponding to the CIIP mode and/or the available status information that indicates the available status of the CIIP mode indicate/indicates that the CIIP mode is forbidden to be used, a value of available status information that indicates an available status of the TPM mode is set to a first value, where when the value of the available status information that indicates the available status of the TPM mode is the first value, the TPM mode is used to perform picture prediction on the current picture block.

It should be understood that a value of available status information that indicates an available status of the TPM mode is set to a first value herein is equivalent to that the TPM is determined as the target merge mode.

In an embodiment, the available status information that indicates the available status of the TPM mode is MergeTriangleFlag.

That a value of available status information that indicates an available status of the TPM mode is set to a first value may be that MergeTriangleFlag is set to 1.

In this application, the target merge mode can be determined based on the high-layer syntax element of the CIP mode and/or the available status information that indicates the available status of the CIIP mode only when the five preset conditions are met. Compared with a conventional solution, more conditions need to be met before the target merge mode is further determined based on the high-layer syntax element and the available status information of the CIIP mode. Otherwise, the CIIP mode may be directly determined as the target merge mode. This can reduce some redundant processes in a process of determining the target merge mode.

From another perspective, when the level-1 merge mode is unavailable, it may be determined, based on some preset conditions, whether to select the CIIP mode as the final merge mode, and the CIIP mode may be directly determined as the target merge mode provided that any one of the preset conditions is not met. This reduces redundancy generated in the process of determining the target merge.

4007: Predict the current picture block based on the target merge mode.

In an embodiment, before the target merge mode is determined based on the high-layer syntax element corresponding to the CIIP mode and/or the available status information that indicates the available status of the CIIP mode, the method shown in FIG. 15 further includes: determining that at least one of the following conditions is met:

A size of the current picture block meets a preset condition; and a skip mode is not used to predict the current picture block.

In an embodiment, that a size of the current picture block meets a preset condition includes: the current picture block meets the following three conditions:

(cdWidth*cbHeight)≥64;
cbWidth<128; and
cbHeight<128.

cdWidth is the width of the current picture block, and cbHeight is the height of the current picture block.

The foregoing describes in detail the picture prediction method in the embodiments of this application with reference to the accompanying drawings. The following describes a picture prediction apparatus in an embodiment of this application with reference to FIG. 16. It should be understood that the picture prediction apparatus shown in FIG. 16 can perform the operations in the picture prediction method in the embodiments of this application. To avoid unnecessary repetition, the following appropriately omits repeated descriptions when describing the picture prediction apparatus in this embodiment of this application.

Figure 16:
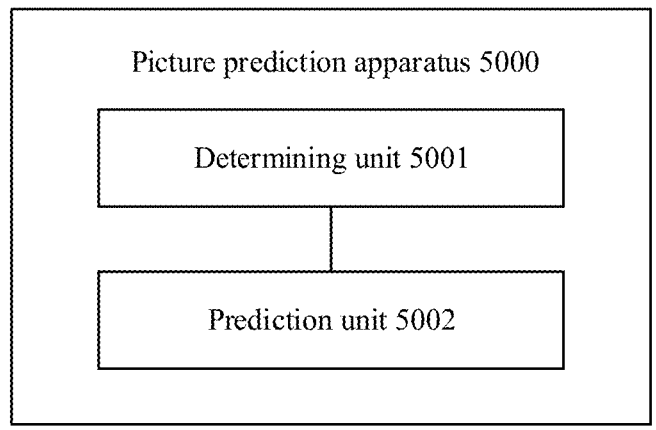
FIG. 16 is a schematic block diagram of a picture prediction apparatus according to an embodiment.

FIG. 16 is a schematic block diagram of a picture prediction apparatus according to an embodiment of this application.

A picture prediction apparatus 5000 shown in FIG. 16 includes a determining unit 5001 and a prediction unit 5002.

The picture prediction apparatus 5000 shown in FIG. 16 is configured to perform the picture prediction method in the embodiments of this application. In an embodiment, the determining unit 5001 in the picture prediction apparatus 5000 may be configured to perform the process of determining the target merge mode in the picture prediction method shown in FIG. 13 to FIG. 15. The prediction unit 5002 in the picture prediction apparatus 5000 is configured to perform the process of performing picture prediction on the current picture block based on the target merge mode in the picture prediction method shown in FIG. 13 to FIG. 15.

Figure 17:
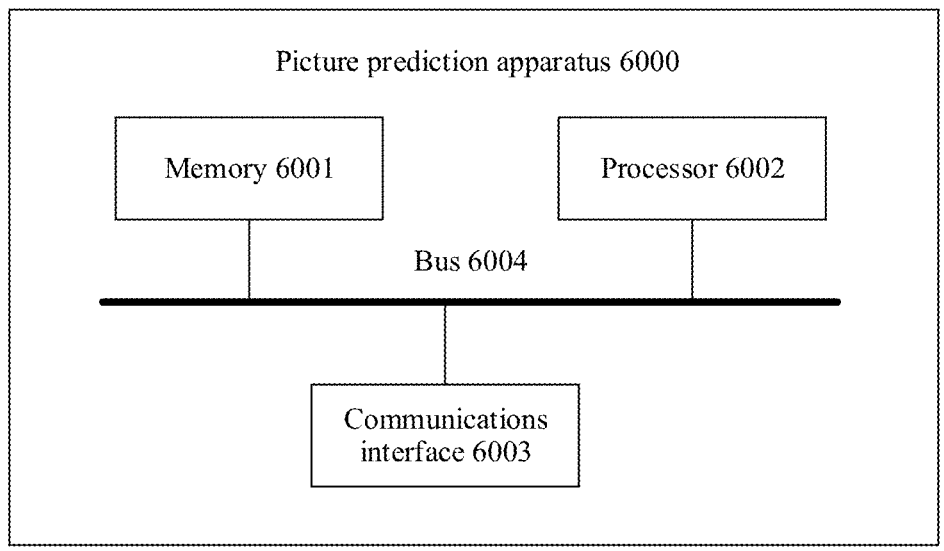
FIG. 17 is a schematic block diagram of a picture prediction apparatus according to an embodiment.

FIG. 17 is a schematic diagram of a hardware structure of a picture prediction apparatus according to an embodiment of this application. A picture prediction apparatus 6000 shown in FIG. 17 (the apparatus 6000 may be a computer device) includes a memory 6001, a processor 6002, a communications interface 6003, and a bus 6004. Communication connections between the memory 6001, the processor 6002, and the communications interface 6003 are implemented through the bus 6004.

The memory 6001 may be a read-only memory (read only memory, ROM), a static storage device, a dynamic storage device, or a random access memory (random access memory, RAM). The memory 6001 may store a program. When the program stored in the memory 6001 is executed by the processor 6002, the processor 6002 is configured to perform the operations of the picture prediction method in the embodiments of this application.

The processor 6002 may use a general-purpose central processing unit (central processing unit, CPU), a microprocessor, an application-specific integrated circuit (application specific integrated circuit, ASIC), a graphics processing unit (graphics processing unit, GPU), or one or more integrated circuits, and is configured to execute a related program, to implement the picture detection method in the method embodiments of this application.

The processor 6002 may be an integrated circuit chip and has a signal processing capability. In an embodiment, the operations of the picture prediction method in this application may be completed by using a hardware integrated logic circuit or an instruction in a form of software in the processor 6002.

The processor 6002 may alternatively be a general-purpose processor, a digital signal processor (digital signal processing, DSP), an application-specific integrated circuit (ASIC), a field programmable gate array (FPGA) or another programmable logical device, a discrete gate or transistor logic device, or a discrete hardware component. The processor 602 may implement or perform the methods, the operations, and logical block diagrams that are disclosed in the embodiments of this application. The general-purpose processor may be a microprocessor, or the processor may be any conventional processor or the like. The operations of the method disclosed with reference to the embodiments of this application may be directly executed and completed by a hardware decoding processor, or may be executed and completed by a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 6001. The processor 6002 reads information in the memory 6001, and completes, in combination with hardware of the processor 6002, functions that need to be performed by units included in the picture prediction apparatus, or performs the picture prediction method in the method embodiments of this application.

The communications interface 6003 uses a transceiver apparatus, for example, but not limited to, a transceiver, to implement communication between the apparatus 6000 and another device or a communications network. For example, information about a to-be-constructed neural network and training data required in a neural network construction process may be obtained through the communications interface 6003.

The bus 6004 may include a path for transmitting information between components (for example, the memory 6001, the processor 6002, and the communications interface 6003) of the apparatus 6000.

The determining unit 5001 and the prediction unit 5002 in the picture prediction apparatus 5000 are equivalent to the processor 6002 in the picture prediction apparatus 6000.

Figure 18:
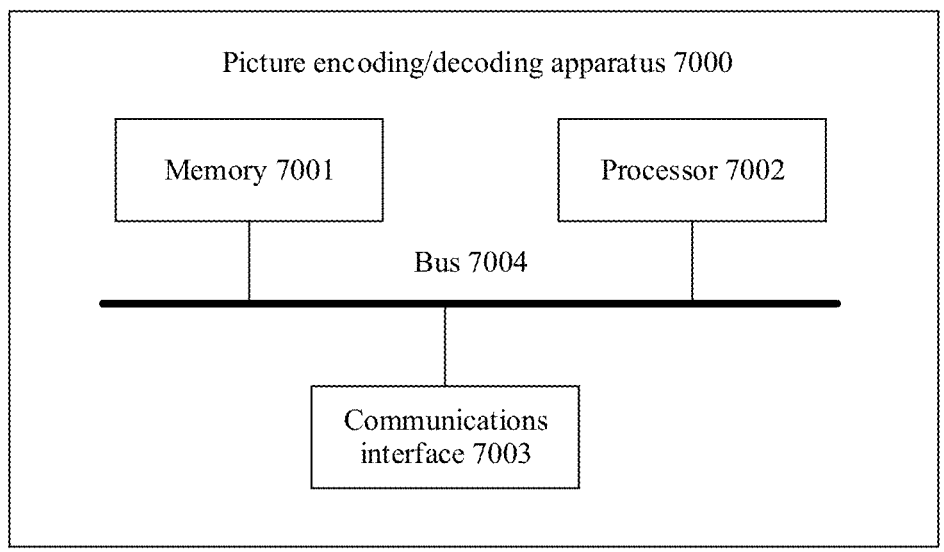
FIG. 18 is a schematic block diagram of a picture encoding/decoding apparatus according to an embodiment.

FIG. 18 is a schematic diagram of a hardware structure of a picture encoding/decoding apparatus according to an embodiment of this application. A picture encoding/decoding apparatus 7000 shown in FIG. 18 (the apparatus 7000 may be a computer device) includes a memory 7001, a processor 7002, a communications interface 7003, and a bus 7004. Communication connections between the memory 7001, the processor 7002, and the communications interface 7003 are implemented through the bus 7004.

The foregoing limitations and explanations of the modules in the picture prediction apparatus 6000 are also applicable to the picture encoding/decoding apparatus 7000, and details are not described herein again.

The memory 7001 may be configured to store a program. The processor 7002 is configured to execute the program stored in the memory 7001. When the program stored in the memory 7001 is executed, the processor 7002 is configured to perform the operations of the picture prediction method in the embodiments of this application.

In addition, when encoding a video picture, the picture encoding/decoding apparatus 7000 may obtain the video picture through the communications interface, and then encode the obtained video picture to obtain encoded video data. The encoded video data may be transmitted to a video decoding device through the communications interface 7003.

When decoding a video picture, the picture encoding/decoding apparatus 7000 may obtain the video picture through the communication interface, and then decode the obtained video picture to obtain a to-be-displayed video picture.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and units, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of decoding implemented by a decoder, comprising:
   performing entropy decoding, inverse quantization process and inverse transform process on a received video bitstream, to obtain a residual block and syntax elements;
   determining whether a merge mode is used for a current picture block;
   determining that the current picture block meets at least one of the following:
      a size of the current picture block meets a preset condition; or
      a skip mode is not used to predict the current picture block;
   when the merge mode is used for the current picture block, determining whether a regular merge mode is available;
   when the regular merge mode is unavailable, and a syntax element sps_triangle_enabled_flag of the syntax elements corresponding to a triangle partition mode (TPM), indicates that the TPM is forbidden to be used, determining a combined intra and inter prediction (CIIP) mode as a target merge mode used for the current picture block, wherein the syntax element sps_triangle_enabled_flag corresponding to the TPM is at a sequence level;
   when the regular merge mode is unavailable, and the syntax element sps_triangle_enabled_flag corresponding to the TPM indicates that the TPM is allowed to be used, determining the target merge mode based on at least one of the syntax element sps_triangle_enabled_flag corresponding to the CIIP mode or available status information of the CIIP mode, wherein the available status information of the CIIP mode is a value of a ciip_flag;
   predicting the current picture block based on the target merge mode to obtain a prediction block of the current picture block; and
   obtaining a reconstructed block of the current picture block based on the prediction block and the residual block.

2. The method according to claim 1, wherein the size of the current picture block meets the preset condition when the current picture block meets the following:
   (cdWidth*cbHeight)≥64;
   cbWidth<128; and
   cbHeight<128;
   wherein the cdWidth is a width of the current picture block, and the cbHeight is a height of the current picture block.

3. The method according to claim 1, wherein
   before determining the target merge mode based on the syntax element sps_triangle_enabled_flag corresponding to the at least one of the CIIP mode or the available status information of the CIIP mode, the method further comprises:
   determining whether a type of a slice or slice group in which the current picture block is located is bi-directional; and determining whether a maximum quantity of candidate TPM modes supported by the slice or slice group in which the current picture block is located is greater than or equal to 2.

4. The method according to claim 1, further comprising:
determining the CIIP mode as the target merge mode, when the regular merge mode is unavailable, and the syntax element sps_triangle_enabled_flag corresponding to the TPM indicates that the TPM is allowed to be used, and any one of the following is not met:
 a type of a slice in which the current picture block is located is bi-directional; and
 a maximum quantity of candidate TPM modes supported by the slice or slice group in which the current picture block is located is greater than or equal to 2.

5. The method according to claim 1, further comprising:
determining the CIIP mode as the target merge mode, when the CIIP mode is allowed to be used, and when any one of the following is not met:
 a TPM mode is allowed to be used;
 a skip mode is not used to predict the current picture block;
 (cbWidth*cbHeight)≥64;
 cbWidth<128; and
 cbHeight<128;
wherein the cbWidth is a width of the current picture block, and the cbHeight is a height of the current picture block.

6. The method according to claim 1, further comprising:
determining the CIIP mode as the target merge mode, when the CIIP mode is allowed to be used, and any one of the following is not met:
 a TPM mode is allowed to be used;
 a type of a slice or slice group in which the current picture block is located is bi-directional;
 a maximum quantity of candidate TPM modes supported by the slice or the slice group in which the current picture block is located is determined to be greater than or equal to 2;
 a size of the current picture block meets a preset condition; and
 a skip mode is not used to predict the current picture block.

7. The method according to claim 1, wherein the syntax elements are the sequence level.

8. The method according to claim 1, wherein the method is performed by a decoder side, to decode the current picture block.

9. A decoding apparatus, comprising:
one or more processors; and
a memory configured to store a program, which when executed by the one or more processors, cause the one or more processors to perform operations, the operations comprising:
 performing entropy decoding, inverse quantization process and inverse transform process on a received video bitstream, to obtain a residual block and syntax elements;
 determining whether a merge mode is used for a current picture block;
 determining that the current picture block meets at least one of the following:
  a size of the current picture block meets a preset condition; or
  a skip mode is not used to predict the current picture block;
 when the merge mode is used for the current picture block, determining whether a regular merge mode is available;
 when the regular merge mode is unavailable, and a syntax element sps_triangle_enabled_flag of the syntax elements corresponding to a triangle partition mode (TPM), indicates that the TPM is forbidden to be used, determining a combined intra and inter prediction (CIIP) mode as a target merge mode used for the current picture block, wherein the syntax element sps_triangle_enabled_flag corresponding to the TPM is at a sequence level;
 when the regular merge mode is unavailable, and the syntax element sps_triangle_enabled_flag corresponding to the TPM indicates that the TPM is allowed to be used, determining the target merge mode based on at least one of the syntax element sps_triangle_enabled_flag corresponding to the CIIP mode or available status information of the CIIP mode, wherein the available status information of the CIIP mode is a value of a ciip_flag;
 predicting the current picture block based on the target merge mode to obtain a prediction block of the current picture block; and
 obtaining a reconstructed block of the current picture block based on the prediction block and the residual block.

10. The apparatus according to claim 9, wherein the size of the current picture block meets the preset condition when the current picture block meets the following:
 (cdWidth*cbHeight)≥64;
 cbWidth<128; and
 cbHeight<128;
wherein the cdWidth is a width of the current picture block, and the cbHeight is a height of the current picture block.

11. The apparatus according to claim 9, wherein before determining the target merge mode based on the syntax element sps_triangle_enabled_flag corresponding to the at least one of the CIIP mode or the available status information of the CIIP mode,
the operations further comprise:
 determining whether a type of a slice or slice group in which the current picture block is located is bi-directional; and
 determining whether a maximum quantity of candidate TPM modes supported by the slice or slice group in which the current picture block is located is greater than or equal to 2.

12. The apparatus according to claim 9, wherein
the operations further comprise:
 determining the CIIP mode as the target merge mode, when the regular merge mode is unavailable, and the syntax element sps_triangle_enabled_flag corresponding to the TPM indicates that the TPM is allowed to be used, and any one of the following is not met:
  a type of a slice in which the current picture block is located is bi-directional; and
  a maximum quantity of candidate TPM modes supported by the slice or slice group in which the current picture block is located is greater than or equal to 2.

13. The apparatus according to claim 9, wherein the operations further comprise:
determining the CIIP mode as the target merge mode, when the CIIP mode is allowed to be used, and when any one of the following is not met:
 a TPM mode is allowed to be used;

a skip mode is not used to predict the current picture block;

(cbWidth*cbHeight)≥64;

cbWidth<128; and cbHeight<128;

wherein the cbWidth is a width of the current picture block, and the cbHeight is a height of the current picture block.

14. The apparatus according to claim 9, further comprising:

determining the CIIP mode as the target merge mode, when the CIIP mode is allowed to be used, and any one of the following is not met:

a TPM mode is allowed to be used;

a type of a slice or slice group in which the current picture block is located is bi-directional;

a maximum quantity of candidate TPM modes supported by the slice or the slice group in which the current picture block is located is determined to be greater than or equal to 2;

a size of the current picture block meets a preset condition; and a skip mode is not used to predict the current picture block.

15. The apparatus according to claim 9, wherein the syntax elements are at the sequence level.

16. A non-transitory computer-readable medium for storing data associated with a video, comprising:

a bitstream stored in the non-transitory computer-readable medium, the bitstream comprising:

encoded data representing a current picture comprising a current picture block;

a first syntax element indicating whether a merge mode is used for the current picture block;

a second syntax element indicating whether a regular merge mode is available;

a fourth syntax element corresponding to a triangle partition mode (TPM), wherein the fourth syntax element indicates whether the TPM is forbidden to be used, and wherein the fourth syntax element sps_triangle_enabled_flag corresponding to the TPM is at a sequence level;

a third syntax element indicating whether a combined intra and inter prediction (CIIP) mode is applied as a target merge mode to the current picture block, wherein the third syntax element indicates that the CIIP mode is applied as a target merge mode to the current picture block when the merge mode is used for the current picture block, when the regular merge mode is unavailable and when the TPM is forbidden to be used;

wherein the third syntax element further indicates that the CIIP mode is applied as a target merge mode to the current picture when the merge mode is used for the current picture block, when the regular merge mode is unavailable, when the TPM is allowed to be used, when the CIIP mode is allowed to be used, and any one of the following is met:

a size of the current picture block meets a preset condition; or a skip mode is not used to predict the current picture block.

17. The non-transitory computer-readable medium according to claim 16, wherein the size of the current picture block meets the preset condition when the current picture block meets the following:

(cdWidth*cbHeight)≥64;

cbWidth<128; and cbHeight<128;

wherein the cdWidth is a width of the current picture block, and the cbHeight is a height of the current picture block.

18. The non-transitory computer-readable medium according to claim 16, wherein the third syntax element further indicates that the CIIP mode is applied as a target merge mode to the current picture when a type of a slice or slice group in which the current picture block is located is bi-directional, and a maximum quantity of candidate TPM modes supported by the slice or slice group in which the current picture block is located is greater than or equal to 2.

* * * * *